(12) United States Patent
Lindley et al.

(10) Patent No.: US 11,912,504 B2
(45) Date of Patent: Feb. 27, 2024

(54) PICKING STATION AND METHOD FOR AUTOMATICALLY PICKING AND AUTOMATICALLY PACKAGING PRODUCTS

(71) Applicant: TGW Logistics Group GmbH, Marchtrenk (AT)

(72) Inventors: Timothy Lindley, Schwerte (DE); Gerald Kettlgruber, Linz (AT); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 365 days.

(21) Appl. No.: 17/416,176

(22) PCT Filed: Dec. 23, 2019

(86) PCT No.: PCT/AT2019/060448
§ 371 (c)(1),
(2) Date: Jun. 18, 2021

(87) PCT Pub. No.: WO2020/140133
PCT Pub. Date: Jul. 9, 2020

(65) Prior Publication Data
US 2022/0048708 A1    Feb. 17, 2022

(30) Foreign Application Priority Data
Jan. 4, 2019    (AT) .............................. A 50005/2019

(51) Int. Cl.
*B65B 35/50*    (2006.01)
*B65G 1/137*    (2006.01)
(Continued)

(52) U.S. Cl.
CPC .............. *B65G 1/1376* (2013.01); *B65B 5/06* (2013.01); *B65B 35/50* (2013.01); *B65G 27/06* (2013.01); *B65G 61/00* (2013.01)

(58) Field of Classification Search
CPC .... B65G 1/1376; B65G 1/1378; B65G 61/00; B65B 5/06; B65B 35/50
(Continued)

(56) References Cited

U.S. PATENT DOCUMENTS 5,955,857 A * 9/1999 Kwon ............... H01L 21/67766
700/121
7,261,510 B2 * 8/2007 Motoori ................. B65G 65/00
414/940
(Continued)

FOREIGN PATENT DOCUMENTS

AT            519 452 B1    7/2018
DE    10 2009 023 808 A1    12/2010
(Continued)

OTHER PUBLICATIONS

International Search Report in PCT/AT2019/060448, dated Jul. 10, 2020.
(Continued)

*Primary Examiner* — Leslie A Nicholson, III
(74) *Attorney, Agent, or Firm* — Collard & Roe, P.C.

(57) ABSTRACT

A picking station (19) as well as a storage and order-picking system (1) for automatic picking and automatic packaging of articles (10*a* . . . 10*p*) is specified. An automated packaging machine (25) and a goods-out conveyor system (20) as well as different types of picking zones (24*a* . . . 24*f*), in which the articles (10*a* . . . 10*p*) for an order are picked and prepared for the packaging process, are included thereby. In particular, the articles (10*a* . . . 10*p*) are stacked on top of each other to form an article stack (41) and are subsequently discharged onto an automated feed conveyor system (26) leading to the automated packaging machine (25) or directly into the automated packaging machine (25). Moreover, a method for operating the picking station (19) described
(Continued)

and/or the storage and order-picking system (1) described is specified.

27 Claims, 9 Drawing Sheets

(51) Int. Cl.
    *B65B 5/06*           (2006.01)
    *B65G 27/06*         (2006.01)
    *B65G 61/00*         (2006.01)

(58) Field of Classification Search
    USPC .................................................. 198/347.1
    See application file for complete search history.

(56) References Cited

U.S. PATENT DOCUMENTS

| | | |
|---|---|---|
| 7,748,519 B2 | 7/2010 | Freudelsperger |
| 8,689,530 B2 | 4/2014 | Prahm et al. |
| 8,708,637 B2 | 4/2014 | Wolkerstorfer |
| 10,564,632 B2 * | 2/2020 | Hsu .................. H01L 21/67727 |
| 11,203,449 B2 * | 12/2021 | Koet ..................... B65B 7/2871 |
| 2013/0031876 A1 | 2/2013 | Fritzsche |
| 2017/0043953 A1 | 2/2017 | Battles et al. |
| 2018/0215485 A1 | 8/2018 | Koet et al. |
| 2020/0024074 A1 | 1/2020 | Herzog-Lang et al. |
| 2020/0269432 A1 | 8/2020 | Beinhofer et al. |

FOREIGN PATENT DOCUMENTS

| | | |
|---|---|---|
| DE | 10 2010 015 414 A1 | 10/2011 |
| DE | 10 2011 106667 A1 | 1/2013 |
| DE | 10 2013 101137 A1 | 8/2014 |
| DE | 20 2015 004 440 U1 | 9/2016 |
| EP | 2 883 817 A1 | 6/2015 |
| EP | 3 354 581 A1 | 8/2018 |
| EP | 2 885 231 B1 | 11/2019 |
| EP | 2 953 872 B1 | 3/2020 |
| JP | 58-63553 B2 | 2/2016 |
| WO | 2006/084750 A1 | 8/2006 |
| WO | 2007/009136 A1 | 1/2007 |
| WO | 2009/094681 A1 | 8/2009 |
| WO | 2009/103441 A1 | 8/2009 |
| WO | 2012/024714 A2 | 3/2012 |
| WO | 2014/044601 A1 | 3/2014 |
| WO | 2018/130712 A2 | 7/2018 |

OTHER PUBLICATIONS

BluePrint Automation (BPA) Gravity 100r Case Packer https://www.youtube.com/watch?v=Ljq3vv8uecc, downloaded Jun. 16, 2021.
Mobile Packaging Line | RMGroup—Manual & Automated Packaging Systems https://www.youtube.com/watch?v=b2pZoKjlmKw, downloaded Jun. 16, 2021.

* cited by examiner

PICKING STATION AND METHOD FOR AUTOMATICALLY PICKING AND AUTOMATICALLY PACKAGING PRODUCTS

CROSS REFERENCE TO RELATED APPLICATIONS

This application is the National Stage of PCT/AT2019/060448 filed on Dec. 23, 2019, which claims priority under 35 U.S.C. § 119 of Austrian Application No. A 50005/2019 filed on Jan. 4, 2019, the disclosure of which is incorporated by reference. The international application under PCT article 21(2) was not published in English.

BACKGROUND OF THE INVENTION

1. Field of the Invention

The invention relates to a picking station for automatic picking and automatic packaging of articles, which picking station comprises an automated packaging machine, as well as a (preferably operated in an automated manner) goods-out conveyor system for transporting packaged articles away, which conveying system is connected, in respect of a conveying stream, to the automated packaging machine on the output side. The invention also relates to a storage and order-picking system, which comprises a goods-in area and an automated article storage, as well as an automated storage conveyor system, which connects, in respect of a conveying stream, the goods-in area with the automated article storage, and an automated retrieval conveyor system, which connects, in respect of a conveying stream, the automated article storage to the picking station. Furthermore, the storage and order-picking system comprises a picking station of the type mentioned above. Lastly, the invention relates to a method for automatic picking and automatic packaging of articles, in which articles are fed to an automated packaging machine and are automatically repacked into dispatch packages by said automated packaging machine and in which the dispatch packages are then transported away from the automated packaging machine by means of a goods-out conveyor system (preferably operated in an automated manner).

2. Description of the Related Art

A picking station, a storage and order-picking system and a method of the type mentioned above are generally known. In this regard, articles, in particular individual articles, are introduced from above into the packaging machine and subsequently packaged in a dispatch package by said packaging machine. The problem here is that the picking operation is inefficient and slow due to the manual feeding of the packaging machine.

Additionally, US 2017/043953 A1 is pointed out, which discloses an automated material handling device, in which, for example, automated conveying vehicles, mobile drive units, robots and automated sorters are operated to make receiving, storing, picking and dispatching articles easier. The devices are controlled by a material handling control system, which sends commands to the different devices in order to coordinate the operation of said devices and to coordinate the article throughput through the material handling system.

In addition, WO 2006/084750 A1 discloses a vertical conveyor in a picking system, which has receptacles that can be opened downwards, through which receptacle, in the opened state, a conveyed good falls down into a next lower receptacle and/or onto the lower transfer location.

Lastly, JP 5863553 B2 discloses a sorting system with a conveying path for transporting articles, a sorting path, which branches off from the conveying path, and a positioning conveyor for container groups as well as a belt conveyor at an upper end of the sorting path.

SUMMARY OF THE INVENTION

An object of the invention now is to provide an improved picking station, an improved storage and order-picking system and an improved method for automatic picking and automatic packaging of articles. Particularly the process when picking the articles and when feeding the packaging machine is to be designed to be more efficient and to proceed more quickly.

The object of the invention is achieved by the picking station of the initially mentioned type, additionally comprising:
a) an automated feed conveyor system for feeding the automated packaging machine, which is connected, in respect of a conveying stream, to the automated packaging machine on the input side, a first automated article discharging device, which is assigned to the automated feed conveyor system, having a first bottom shelf with a first closable bottom opening and a second bottom shelf with a second closable bottom opening, wherein the first bottom shelf is arranged above the second bottom shelf, and the second bottom shelf is arranged above the feed conveyor system, and/or
b) an automated reloading device, an automated feed conveyor system for feeding the automated packaging machine, which is connected, in respect of a conveying stream, to the automated packaging machine on the input side, and which extends in the operating range of the reloading device, as well as a bottom shelf of the automated reloading device in the operating range of the automated reloading device, and/or
c) a second automated article discharging device, which is assigned to the automated packaging machine, which has a third bottom shelf having a closable third bottom opening arranged above a loading position of the automated packaging machine, wherein a dispatch package prepared for closing can be provided at the loading position, and/or
d) an automated unloading device, which is assigned to the automated packaging machine, for automatically providing a transport loading aid above a loading position of the automated packaging machine and for discharging an article from the transport loading aid into a dispatch package provided at the loading position and prepared for closing.

The object of the invention is also achieved by a storage and order-picking system of the initially mentioned type, wherein the picking station is configured as described above.

Lastly, the object of the invention is achieved by a method of the initially mentioned type, in which
a) the articles are placed (preferably individually) on a first bottom shelf before packaging, a first bottom opening arranged in the first bottom shelf is opened for one article at a time, the article falls through the first bottom opening and becomes part of an article stack on a second bottom shelf below the first bottom shelf, a second bottom opening in the second bottom shelf is opening after a stack has been formed, and the article stack is conveyed, by the feed conveyor system, to the automated packaging machine and automatically repacked there into the dispatch package, and/or b) the articles are placed (preferably individually) on a bottom shelf of the automated reloading device before packing, taken over from there by a reloading device and placed on a feed conveyor system as part of an article stack, and the article stack is conveyed, after a stack has been formed, from the feed conveyor system to the automated packaging machine and is automatically repacked there into the dispatch package, and/or c) the articles are placed (preferably individually) on a third bottom shelf before packing, a third bottom opening arranged in the third bottom shelf is opened for one article at a time, the article falls (individually or as part of an article stack) through the third bottom opening and into a dispatch package provided at the automated packaging machine at a loading position and prepared for closing, and/or d) the articles are successively provided at an automated unloading device having transport loading aids, and the transport loading aids are automatically unloaded in succession, wherein the automatic unloading comprises step i) positioning the transport loading aid above a loading position of the automated packaging machine, and step ii) transferring the article from the transport loading aid immediately into the dispatch package provided at the loading position and prepared for closing.

By the suggested measures, the process when picking the articles and when feeding the automated packaging machine is designed to be more efficient and proceeds more quickly. In this regard, the methods introduced in cases a) to d) may be performed particularly in a fully automated manner. This means that supplying articles to be picked, picking the articles, feeding the automated packaging machine with articles, packaging the articles in a dispatch package, and transporting the filled dispatch package away may be performed in a fully automated manner.

In case d), the article is transferred and/or dropped/slid directly into the dispatch package. However, it is also conceivable that the article is indirectly conveyed into the dispatch package, for example via a conveying device (in particular a slide).

At this point, it should also be noted that in a picking station and/or in a method for automatic picking and automatic packaging of articles, the measures suggested in points a) to d) may be applied either individually or in any desired combination. Furthermore, it should be noted that articles of different types may preferably or exclusively be picked according to a specific one of the measures suggested in points a) to d).

It may for example be provided that articles, which are impossible or difficult to pick automatically, are transported to a manual picking zone and are picked there. Articles, which are easy to pick, however, may be preferably or exclusively be transported to an automatic picking zone and be picked there.

In other words, in a first step, it is determined to which group of types of articles the articles belong, for example based on their dimensions, weight, dimensional stability and the like. Subsequently, the articles are selectively transported, in accordance with the determined group of types of articles, to the first automated article discharging device (if available), the reloading device (if available), the second automated article discharging device (if available), to the automated unloading device (if available), which is assigned to the automated packaging machine, or a working area for a picker (if available).

The first group of types of articles contains types of articles which can be automatically handled, and a second group of types of articles contains types of articles, which cannot at all be automatically handled or only in a limited manner but can be handled manually.

The first group of types of articles may also comprise a first subgroup of types of articles, which contains types of articles that can be automatically handled by a gripper, and comprise a second subgroup of types of articles, which contains types of articles that cannot at all be automatically handled by the gripper or only in a limited manner.

While the articles of the first subgroup of types of articles are transported to the reloading device (also see FIG. 4), the articles of the second subgroup of types of articles are transported to the first automated article discharging device (also see FIG. 3) or to the second automated article discharging device (also see FIG. 6) or also to the automated unloading device (also see FIG. 7), which is assigned to the automated packaging machine, if the first automated article discharging device, the second automated article discharging device and/or the automated unloading device, which is assigned to the automated packaging machine, are present.

The articles of the second group of types of articles are transported to the automated unloading device (also see FIG. 5), which is assigned to a working area, where said articles are manually picked by a picker.

In a "storage and order-picking system", articles can for example be delivered to a goods-in area and be taken over and then optionally be repacked and stored in an automated article storage. The articles can also be picked according to an order, meaning that they can be removed from the automated article storage, assembled into an order, and provided for transport at the goods-out area. As opposed to a manufacturing process, the articles are not substantially changed between the goods-in area and the goods-out area. However, a slight change in shape is possible, in particular in case of non-rigid bodies such as pouches or bags or other resilient packaging, for example from cardboard or plastic materials.

"Articles" are generally objects of merchandise trade and they are delivered at the goods-in area and transported, at the goods-out area, to a customer according to an order. In the context of the invention, an "article" in particular is understood as an individual object that can be handled and/or an individual group of objects that can be handled. An article may particularly be an article of clothing, for example a "shirt, white, size 42" or a "jeans, size 34/34" or a "sock, black, size 43". Of course, an article may also be of a different type and for example be a pack of "tagliatelle, 1 kg" or a bottle of "tomato sauce".

An "order for picking articles" (in short "picking order") comprises one article or multiple articles, which may be stored in different storage zones. For example, socks may be stored in a first storage zone in first transport loading aids, which are configured as containers. Shirts, in contrast, may be stored in a second storage zone in second transport loading aids, which are configured as hanging bags.

An "order-processing computer" serves to acquire an order and execute same. In particular, the order-processing computer is for this purpose connected, in terms of control technology, to elements of the storage and order-picking system, in particular to the automated storage conveyor system and retrieval conveyor system of the storage and order-picking system.

Within the scope of the invention, "order-picking" is to be understood to mean the compilation of ordered articles for a picking order.

"Article-specific" means that the articles stored in a transport loading aid have the same type of article. For example, a first transport loading aid contains the article "A" and a second transport loading aid contains the article "B" and so on. On the other hand, the transport loading aids may be subdivided into multiple receiving compartments by separating walls and receive different types of articles, wherein an article "A" may be received in the first receiving compartment and an article "B" may be received in the second receiving compartment. In contrast, the articles stored in a storage zone or in a transport loading aid in a "mixed" or "non-article-specific" manner, have different types of articles.

A "storage area" is a region in the storage and order-picking system, which has a plurality of storage places for storing the articles. For example, the storage area can be configured as a stationary or mobile storage rack, which provides a plurality of storage places located next to one another or on top of one another. However, it is also conceivable that the storage area is a region on the floor of the storage and order-picking system, which is provided and/or reserved for placing and storing an article. Regions for walking and traveling are therefore no storage areas, although they can connect to them. The sum of the storage zones forms the "automated article storage".

An automated article storage may comprise an "article supply store", that is a storage zone in which predominantly or exclusively new articles are stored. "(A) new article(s)" is/are (an) article(s) which has/have not yet been dispatched and is/are available for an order. An automated article storage may, however, also comprise an "return articles store", that is a storage zone in which predominantly or exclusively return articles are stored. "(A) return article(s)" is/are article(s) which has/have already been dispatched but was/were sent back by the recipient and is/are available for a new order.

The "first storage zone" serves to store the first transport loading aids. In particular, only first transport loading aids, and no hanging bags, are stored there. For example, the first storage zone may be formed by shelf units and/or or by other holding spaces for the first transport loading aids, in particular by holding spaces on the floor. For storing and retrieving first transport loading aids, conveying vehicles operated in an automated manner may be provided in the first storage area.

The "second storage zone" serves to store hanging bags and/or article transport carriers for suspended transport of articles, for example on clothes hangers. In particular, only hanging bags and/or article transport carriers, and no first transport loading aids, are stored there. For example, the second storage zone may be formed by overhead storage tracks.

A "goods-out area" is to be understood to mean that region in which ordered articles are discharged from the storage and order-picking system. Generally, the goods-out area may also be referred to as "article transfer zone".

A "goods-in area" is to be understood to mean that region in which articles are introduced into the storage and order-picking system. Generally, the goods-in area may also be referred to as "article acceptance zone". In particular, article carriers (e.g. pallets, cardboard boxes etc.) which have been delivered can be separated in a manual or automated manner. This process is also referred to as "de-palletizing".

A "dispatch package" or a "target loading aid" serves to receive the articles during the picking operation and may in particular be configured as a container, cardboard box, tray, pallet, bag (in particular a "polybag"), pouch, sack or hanging bag. The target loading aid may serve to transport ordered articles out of the storage and order-picking system. Yet the target loading aid may also function as an "interim loading aid", in which articles that have been picked and are intended for dispatching are interim-stored before being reloaded into a (different) dispatch package. One dispatch package or multiple dispatch packages may also be packaged in an outer packaging.

An "automated packaging machine" serves to automatically package articles into dispatch packages. One single article or a plurality of articles are packed into the dispatch package. A dispatch package may for example be an opened container, such as an open bag (in particular a "polybag") or an open cardboard box, which container is automatically closed after packing, or also a packaging which is formed during the packing operation. The article may be packed, for example, in a film tube, which is heat-sealed and/or glued together in the course of the packaging operation. Folding a carton in the course of the packaging operation would for example also be possible. During the packaging operation, the dispatch package is in a "loading position".

An "article stack" comprises multiple articles stacked on top of each other. A "dispatch document" printed by means of a printer may also be arranged below the article stack, in the article stack or on the article stack. A dispatch document is, for example, a delivery slip and/or an invoice.

A "first transport loading aid" serves to transport articles and particularly has one or multiple of the following properties:
  A first transport loading aid is stored in the first storage zone standing upright or lying down and transported on the conveying system standing upright or lying down.
  A first transport loading aid is configured as a container, cardboard box, tray, pallet or shelf unit.

At this point, it should be noted that not all first transport loading aids must have the same properties, but first transport loading aids may also be configured differently. Additionally, first transport loading aids may have multiple receiving areas/receiving compartments.

A "second transport loading aid" is a transport loading aid configured as a hanging bag and/or article transport carrier for suspended transport of an article (for example on a clothes hanger) and particularly has one or multiple of the following properties:
  A hanging bag and/or an article transport carrier is stored in the second storage zone in a suspended manner and is transported on the conveying system in a suspended manner.

In particular, a hanging bag comprises a front wall, a rear wall, a base, a storing space limited by the front wall, the rear wall and the floor and a loading opening and/or unloading opening configured at the hanging bag at a first side and limited by the front wall, the rear wall and the floor. The hanging bag may at a second side also have a side wall stop, against which the article(s) can be applied. In particular, the front wall, the rear wall and the base may be formed as a single piece, for example by a length of fabric or woven cloth, which is mounted at an overhead track/suspension rod at its upper end and forms a loop in the floor area. In a closed position, the front wall and the rear wall have only a small distance from each other, whereby the loading opening and unloading opening has a small surface area and the storing space of the hanging bag has a small volume. In the case of a length of fabric or woven cloth, its upper ends equally have only a small distance from each other, and the loop formed by the length of fabric or woven cloth is narrow. In the closed position, the article(s) can thus be stored and transported in a narrow space. In an open position, in contrast, the front wall and the rear wall have a large distance from each other, whereby the loading opening and unloading opening has a large surface area and the storage space of the hanging bag has a large volume. In the case of a length of fabric or woven cloth, its upper ends equally have a large distance from each other, and the loop formed by the length of fabric or woven cloth is wide. In the open position, the hanging bag is thus easy to load and unload. Such a hanging bag is disclosed, for example, in the German utility model DE 20 2017 106 993 U1, DE 20 2017 100 206 U1 or the Austrian patent application A 50320/2018 (WO 2019/195871 A1). In a particular embodiment, the hanging bag may also have a bottom flap that is opened during the unloading operation. In particular, the bottom flap may be opened automatically by an automated unloading device.

A possible embodiment of an article transport carrier for suspended transport of an article is described, for example, in DE 20 2015 004 440 U1.

It should also be noted in this context that not all hanging bags must have the same properties, but hanging bags may also be configured differently. In addition, hanging bags may have multiple storing zones/storing compartments.

The "operating position" of a first or second transport loading aid is characterized in that articles are storable in it and transportable using the conveying system.

A "conveying system" generally serves to transport transport loading aids and/or articles as well as dispatch packages. In particular, the conveying system may be segmented into different, functional regions, for example an "automated storage conveyor system" serving to transport articles from the goods-in area into a storage zone, a "retrieval conveyor system" serving to transport articles from the storage zone to the picking station, a "feed conveyor system" serving to transport picked articles (in particular article stacks) from a picking zone to the automated packaging machine, and a "goods-out conveyor system" serving to transport dispatch packages from the automated packaging machine to the goods-out area. The individual regions of the conveying system may furthermore be subdivided into multiple sections. For example, the automated storage conveyor system may be segmented into multiple "storage sections", the retrieval conveyor system into multiple "retrieval sections", the feed conveyor system into multiple "feed conveying sections" and the goods-out conveyor system into multiple "goods-out area sections". The conveying system may moreover be technologically divided into a "stationary conveying system" and "conveying vehicles operated in an automated manner".

For the transport of articles, a "stationary conveying system" requires permanently-integrated facilities. A stationary conveying system is to be understood to mean, in particular, roller conveyors, belt conveyors, chain conveyors and suchlike.

Within the scope of the invention, "conveying vehicles operated in an automated manner" are to be understood to mean self-driving, driverless conveying vehicles and/or autonomous mobile robots ("automated guided vehicle", in short "AGV") for transporting articles and/or transport loading aids, which travel along permanently specified lanes or which are freely guided, i.e. without fixed track guidance. Each autonomous mobile robot comprises a chassis having a drive unit and a loading platform arranged on the chassis for receiving, discharging, and transporting articles and/or transport loading aids. Instead of the loading platform, or additionally to it, the conveying vehicle operated in an automated manner may also have a (telescopable) suspension rod and/or overhead track for receiving hanging bags. For example, the transport platform/suspension rod may be permanently affixed to the conveying vehicle, yet the transport platform/suspension rod may also be vertically and/or laterally movable relative to a chassis of the conveying vehicle, for example to be able to store articles into a storage rack and retrieve them from the storage rack. At least one of the wheels of the drive unit is steerable, unless the autonomous conveying vehicle has wheels with which also a lateral movement can be executed (e.g. Mecanum wheels). An autonomous mobile robot also comprises sensors for capturing the environment of the mobile robot and for spatial orientation. Different technologies are known for navigating the autonomous mobile robots. Hence, besides the trackguided, inductive or optical navigation, laser navigation is also used in which each mobile robot is equipped with a laser scanner that detects stationary reference points in the environment and navigates the mobile robot on the basis of the detected environmental features. Navigation is also possible by means of a GPS system, in particular by means of the differential global positioning system (dGPS). Usually, a superordinate main computer controls the autonomous mobile robots. A conveying system of the mentioned type thus comprises the mobile robots, means for determining the location and detecting the position of the mobile robots and means for transmitting data to and from the mobile robots in the transport system.

A "storage and retrieval device" is a conveying vehicle operated in an automated manner which travels on rails and may be designed as a single-level storage and retrieval device (also referred to as "shuttle") or as a multi-level storage and retrieval device.

Within the scope of the invention, the conveying system may comprise and/or be made up of a generally stationary conveying system and/or conveying vehicles (in particular mobile robots) operated in an automated manner. This applies to the "automated storage conveyor system", the "retrieval conveyor system", the "feed conveyor system" as well as the "goods-out conveyor system". Alternatively, the "goods-out conveyor system" may also comprise a manually operated transport vehicle (for example a pallet jack, an electric pallet jack or a forklift truck), which transports the packaged articles away from the automated packaging machine. In this case, a collection container is preferably provided at the automated packaging machine, into which collection container the packaged articles are discharged from the loading position. The filled collection container is subsequently manually transported away from the automated packaging machine using the "goods-out conveyor system".

On the other hand, the filled collection container may also be automatically transported away from the automated packaging machine by means of a "goods-out conveyor system" operated in an automated manner.

Within the scope of the invention, the conveying system may also be categorized with respect to the transport loading aids transported by it, specifically in a conveying system for the upright transport of the first transport loading aids or a conveying system for the suspended transport of the second transport loading aids. The latter particularly comprises transport overhead tracks for transporting hanging articles and hanging bags ("overhead conveyor system"). Within the scope of the invention, the conveying system may alternatively or additionally be configured to directly transport articles (meaning without the aid of transport loading aids).

A "picking station" is a station and/or a zone or location, at or in which articles are assembled into an order. The picking station may have a picking control for controlling the picking operation of the ordered articles. Yet it would also be conceivable that the picking operation is controlled, alternatively or additionally, by the order-processing computer.

A "picking zone" is a zone in the picking station, at or in which articles are assembled into an order in a separate process. A picking zone may be configured for automatic, manual or mixed automatic/manual operation, wherein the manual operation may in particular be computer-aided. To this end, the picking zone may comprise different functional units, for example a "reloading device", an "automated unloading device", a "conveying device" and/or an "article discharging device". A picking zone may further comprise an output unit (e.g. a display or a voice output unit), an input unit (e.g. a keyboard, a touch display or a voice input unit) and/or a capturing unit (e.g. a scanner). In automatic or mixed automatic/manual operation, the "reloading device", the "automated unloading device", the "conveying device" and/or the "article discharging device" can be instructed to execute a particular sequence of movements. In manual or mixed automatic/manual operation, a picker can be instructed with the help of the output unit to execute a particular process. The picker can offer feedback via the input unit and/or the capturing unit. The above-mentioned process is therefore done in a computer-aided manual manner. The mentioned functional units can be controlled by a control in the respective picking zone. Yet it would also be conceivable that said functional units are controlled, alternatively or additionally, by the order-processing computer.

In "automatic" operation, e.g. a robot independently executes specified sequences of movement. In "automated operation", a facility can work, fully or partially, without human assistance. "Automated" operation may accordingly be automatic and/or computer-aided manual operation. In "computer-aided manual" operation, a picker receives instructions from a control and, if applicable, offers feedback to the control. In "mixed manual/automatic" operation, parts of a process are executed automatically (e.g. by a robot), other parts by a picker (e.g. in a computer-aided manual manner).

A "mobile shelf unit" is a movable shelf unit which is not fixed at a particular location. A mobile shelf unit may in particular comprise wheels for easier transport.

An "overhead track" is a track, on which hanging bags or article transport carriers can be stored and/or transported in a suspended manner. A "storage overhead track" is therefore an overhead track on which hanging bags or article transport carriers can be stored in a suspended manner and which is in particular arranged in the second storage zone. A "transport overhead track" is an overhead track via which hanging bags or article transport carriers can be transported in a suspended manner. A "mobile storage overhead track" is a movable overhead track which is not fixed at a particular location. A mobile storage overhead track may in particular be structured similarly to a mobile shelf unit and equally have wheels for easier transport.

The storage and order-picking system may also comprise a sorting device. A "sorting device" is a device with which articles and/or transport loading aids can be brought into a specified or specifiable sequence.

An "article discharging device" serves to stack articles and may have one "bottom shelf" or multiple bottom shelves, which comprise movable flaps for releasing or closing a "bottom opening". Multiple bottom shelves of the article discharging device may also be connected to each other by means of "shaft walls" or be surrounded by them. A "bottom shelf" may also be pivoted in its entirety and thus comprise one (single) movable flap or be formed by one.

A "bottom shelf" is generally a rest surface for articles, in particular a flat rest surface.

An "automated unloading device" serves to automatically unload a first transport loading aid and/or a second transport loading aid. In particular, the transport loading aid may be tilted in this process, such that the article slides out of the transport loading aid. It would also be conceivable that the transport loading aid is provided with a bottom opening which is released when unloading the article. An example for an automated unloading device for automatically unloading a transport loading aid, which is configured as a hanging bag, is disclosed in AT 50320/2018 (WO 2019/195871 A1).

A "conveying device" serves to further transport articles, which have been unloaded out of the transport loading aid. In particular, the conveying device may be configured as a slide. Yet it would also be conceivable that the conveying device is configured for example as a conveyor belt, conveyor chain, belt conveyor or roller conveyor.

The specification that "the automated unloading device is arranged above the first bottom shelf" according to case a) or that "the automated unloading device is arranged above the bottom shelf of the automated reloading device" according to case b) or that "the automated unloading device is arranged above the bottom shelf of the picking working area" comprises, within the scope of the invention, both positions vertically above the first bottom shelf/bottom shelf of the automated reloading device/bottom shelf of the picking working area and positions, which are situated vertically and laterally of the first bottom shelf/bottom shelf of the automated reloading device/bottom shelf of the picking working area. A horizontal component in the path of an article toward the first bottom shelf/bottom shelf of the automated reloading device/bottom shelf of the picking working area may be overcome by a conveying device (e.g. a slide) or by the article being conveyed, along a projectile motion, onto the first bottom shelf/bottom shelf of the automated reloading device/bottom shelf of the picking working area.

The specification that "the third bottom shelf is arranged above a loading position of the automated packaging machine" according to case c) comprises, within the scope of the invention, both positions vertically above the loading position and positions, which are situated vertically and laterally of the loading position. In particular, this means that a discharging position of the article, in which the article is unloaded by means of the third bottom opening, and the loading position, in which the article is packed in a provided dispatch package prepared for closing, do not necessarily have to be arranged perpendicularly above each other, but may also be positioned vertically above each other and laterally offset. A horizontal component in the path of an article toward the loading position may be overcome by means of a conveying device (e.g. a slide) or by the article being conveyed into the automated packaging machine along a projectile motion. Additionally, the term "above" is to be understood to mean that a vertical distance between the discharging position and loading position may also be only a few millimeters. The article can then be packed particularly gently in a provided dispatch package prepared for closing.

The specification that "the automated unloading device is arranged above a loading position of the automated packaging machine" according to case d) comprises, within the scope of the invention, both positions vertically above the loading position and positions, which are situated vertically and laterally of the loading position. In particular, this means that a discharging position of the article, in which the article is unloaded from a transport loading aid by means of the automated unloading device, and the loading position, in which the article is packed in a provided dispatch package prepared for closing, do not necessarily have to be arranged perpendicularly above each other, but may also be positioned vertically above each other and laterally offset. A horizontal component in the path of an article toward the loading position may be overcome by means of a conveying device (e.g. a slide) or by the article being conveyed into the automated packaging machine along a projectile motion. Additionally, the term "above" is to be understood to mean that a vertical distance between the discharging position and loading position may also be only a few millimeters. The article can then be packed particularly gently in a provided dispatch package prepared for closing.

A "rearrangement robot" serves to rearrange articles at the goods-in area. For example, articles which have been delivered can be separated and loaded into provided transport loading aids, for example containers and/or hanging bags.

A "reloading device" serves to picking articles in an automated manner. A reloading device may in particular be configured as a gantry robot or as a jointed-arm robot. The reloading device may also have a "bottom shelf of the automated reloading device", i.e. a reloading device for articles.

Advantageous designs and further advancements of the invention result from the sub-claims as well as from the description in combination with the figures.

It is favorable if the picking station comprises a working area for a picker, an automated feed conveyor system for feeding the automated packaging machine, which is connected, in respect of a conveying stream, to the automated packaging machine on the input side and which extends in the operating range of the picker, as well as a bottom shelf of the picking working area in the operating range of the picker. Accordingly, it is also favorable if, before being packaged, the articles are supplied on a bottom shelf of the picking working area in the operating range of a picker, collected from there by a picker and placed on a feed conveyor system as part of an article stack, and the article stack is conveyed, after a stack has been formed, from the feed conveyor system into the automated packaging machine and is automatically put into the dispatch package there. Thus, particularly articles, which could not be automatically picked at all or only with substantial technical effort and/or at a substantial error rate, can be picked.

Advantageously, the picking station comprises a retrieval conveyor system for supplying articles (particularly by means of transport loading aids), which, in case a), is connected, in respect of a conveying stream, to the first bottom shelf, in case b), is connected, in respect of a conveying stream, to the bottom shelf of the automated reloading device, in case c), is connected, in respect of a conveying stream, to the third bottom shelf, and in the case of the manual picking zone having a working area for a picker, is connected, in respect of a conveying stream, to the bottom shelf of the picking working area. Accordingly, it is advantageous if the articles are supplied by means of a retrieval conveyor system (particularly by means of transport loading aids), wherein the retrieval conveyor system in case a), is connected, in respect of a conveying stream, to the first bottom shelf, in case b), is connected, in respect of a conveying stream, to the bottom shelf of the automated reloading device, in case c), is connected, in respect of a conveying stream, to the third bottom shelf, and in the case of the manual picking zone, is connected, in respect of a conveying stream, to the bottom shelf of the picking working area. Thus, the articles are automatically transported from the warehouse to the picking station and/or to the individual picking zones.

It is favorable if the retrieval conveyor system comprises an overhead conveyor system having transport loading aids for transporting articles or is formed by one. The transport loading aids are formed by hanging bags for each receiving at least one article and/or article transport carrier for the suspended transport of at least one article each. This allows transporting articles in a space-saving manner, i.e. at a higher density.

It is also advantageous if the picking station in cases a), b) and c) as well as in the case of a manual picking zone comprises at least one automated unloading device (arranged in the course of the retrieval conveyor system) for automatically unloading a transport loading aid, which automated unloading device in case a), is (directly or indirectly) connected, in respect of a conveying stream, to the first bottom shelf, in case b), is (directly or indirectly) connected, in respect of a conveying stream, to the bottom shelf of the automated reloading device, in case c), is (directly or indirectly) connected, in respect of a conveying stream, to the third bottom shelf, and in the case of the manual picking zone, is (directly or indirectly) connected, in respect of a conveying stream, to a bottom shelf of the picking working area. Thus, a transport loading aid can be automatically unloaded.

It is particularly advantageous in the above context, if the automated unloading device in case a), is arranged above the first bottom shelf and is configured to automatically discharge the article from the transport loading aid onto the first bottom shelf, in case b), is arranged above the bottom shelf of the automated reloading device and is configured to automatically discharge the article from the transport loading aid onto the bottom shelf of the automated reloading device, in case c), is arranged above the third bottom shelf and is configured to automatically discharge the article from the transport loading aid onto the third bottom shelf, and in the case of the manual picking zone, is arranged above the bottom shelf of the picking working area and is configured to automatically discharge the article from the transport loading aid onto the bottom shelf of the picking working area.

Equally, it is advantageous if the articles in case a), are discharged automatically, by means of an automated unloading device arranged above the first bottom shelf, from a transport loading aid onto the first bottom shelf, in case b), are discharged automatically, by means of an automated unloading device arranged above the bottom shelf of the automated reloading device, from a transport loading aid onto the bottom shelf of the automated reloading device, in case c), are discharged automatically, by means of an automated unloading device arranged above the first bottom shelf, from a transport loading aid onto the third bottom shelf, and in the case of the manual picking zone, are discharged automatically, by means of an automated unloading device arranged above the bottom shelf of the picking working area, from a transport loading aid onto the bottom shelf of the picking working area.

Thus, a direct connection to the automated unloading device in respect of a conveying stream is established.

However, it is also advantageous if the automated unloading device in case a), is configured to automatically discharge the article from the transport loading aid onto a conveying device (in particular a slide), and the conveying device is configured to automatically discharge the article onto the first bottom shelf, in case b), is configured to automatically discharge an article from the transport loading aid onto a conveying device (in particular a slide), and the conveying device is configured to automatically discharge the article onto the bottom shelf of the automated reloading device, and in case c), is configured to automatically discharge the article from the transport loading aid onto a conveying device (in particular a slide), and the conveying device is configured to automatically discharge the article onto the third bottom shelf, and in the case of the manual picking zone, is configured to automatically discharge the article from the transport loading aid onto a conveying device (in particular a slide), and the conveying device is configured to automatically discharge the article onto the bottom shelf of the picking working area.

Equally, it is advantageous if the articles in case a), are automatically discharged, by means of an automated unloading device, from a transport loading aid onto a conveying device (in particular a slide) and are automatically discharged from the conveying device onto the first bottom shelf, in case a), are automatically discharged, by means of an automated unloading device, from a transport loading aid onto a conveying device (in particular a slide) and are automatically discharged from the conveying device onto the bottom shelf of the automated reloading device, in case a), are automatically discharged, by means of an automated unloading device, from a transport loading aid onto a conveying device (in particular a slide) and are automatically discharged from the conveying device onto the third bottom shelf, and in the case of the manual picking zone, are automatically discharged, by means of an automated unloading device, from a transport loading aid onto a conveying device (in particular a slide) and are automatically discharged from the conveying device onto the bottom shelf of the picking working zone.

Thus, an indirect connection to the automated unloading device in respect of a conveying stream is established, which leads over a conveying device.

It is also particularly advantageous if the first automated article discharging device in case a) has shaft walls, which surround the first bottom shelf and second bottom shelf. Thus, articles are oriented toward the second bottom shelf when falling, if this should be necessary.

Furthermore, it is advantageous if the picking station in case b) comprises a plurality of automated reloading devices, and the feed conveyor system comprises multiple first feed conveying sections in the operating range of the plurality of reloading devices and a second feed conveying section connecting them in respect of a conveying stream, which is connected to a third feed conveying section coupling with the automated packaging machine. This allows connecting multiple reloading devices to the automated packaging machine without the reloading devices having to be connected along a conveying section leading toward the automated packaging machine.

It is favorable if the reloading device in case b) is configured as a gantry robot or articulated-arm robot and/or comprises a suction gripper. The suction gripper may for example be installed on a robot arm, which, in turn, is mounted on a travel crossbeam so as to be movable (in particular can be displaced/tilted/rotated). Instead of a suction gripper, a mechanical gripper, for example, may also be provided.

It is further advantageous if the picking station comprises a printer, which in case a), is connected, in respect of a conveying stream, to the second bottom shelf, in case b), is connected, in respect of a conveying stream, to the feed conveyor system, in case c), is connected, in respect of a conveying stream, to the automated packaging machine and in the case of the manual picking zone, is connected, in respect of a conveying stream, to the feed conveyor system. Thus, a dispatch document (for example an invoice or a delivery slip) can be printed and placed under the article stack, in the article stack or on the article stack.

It is also advantageous if the picking station in case d) has a fourth automated bottom shelf, which is pivotable about a pivot point into an essentially horizontal position and an inclined position (particularly such that a trajectory on the bottom shelf points in the conveying direction). The articles are automatically discharged, by means of an automated unloading device, from a transport loading aid onto the fourth automated bottom shelf, which is oriented in a substantially horizontal position for stacking the articles and is pivoted about a pivot point into an inclined position for transferring the articles. In this embodiment variant, the stacks are therefore formed on the fourth automated bottom shelf in its substantially horizontal position. It is pivoted into an inclined position for forwarding the articles. In this process, the article stack does not fall downwards vertically but moves (particularly slides) across the inclined bottom shelf. Thereby the article stack remains more stable during transfer.

It is additionally advantageous of the automated packaging machine has an inclined base, on which a dispatch loading aid having an opening pointing in the direction of the fourth automated bottom shelf can be arranged. The articles then move (in particular slide) from the fourth automated bottom shelf pivoted in the inclined position into the dispatch loading aid, which is provided on the inclined base of the automated packaging machine and points, with an opening, in the direction of the fourth automated bottom shelf. In this embodiment variant, the article stack moves (in particular slides)—supported by the base of the automated packaging machine—into the opened dispatch loading aid prepared there. The dispatch loading aid can thus be loaded more easily. In particular, the article stack can remain more stable. Particularly plastic bags ("polybags") are suitable as dispatch loading aids. This embodiment variant may, however, also generally be applied to other dispatch loading aids, such as cone-shaped or box-shaped cardboard box packagings. A banding machine may also be situated upstream of the provision location for the dispatch loading aid, which banding machine wraps a band around the article stack and thus further secures the same.

It is also particularly advantageous if the picking station comprises a third automated article discharging device which is arranged above the fourth automated bottom shelf, which third automated article discharging device has a fifth bottom shelf having a closable fifth bottom opening. The articles are then automatically discharged, by means of an automated unloading device, from a transport loading aid onto the fifth bottom shelf having the closable fifth bottom opening, from where they are discharged onto the fourth automated bottom shelf arranged below the fifth bottom shelf, which fourth automated bottom shelf is oriented in a substantially horizontal position for stacking the articles and is pivoted about a pivot point into an inclined position for transferring the articles. Thus, an article coming from the transport loading aid can be pre-positioned, such that the article stack may be formed more exactly.

It is also favorable if a slide is arranged between the inclined base of the automated packaging machine and the fourth automated bottom shelf. This allows easily connecting the fourth automated bottom shelf to the automated packaging machine in respect of a conveying stream.

The term "substantially horizontal" used above may mean that the bottom shelf does not have to be moved exactly in a horizontal position but may also assume an angular position slightly deviating from the horizontal position, in particular by ±5°. This may prove advantageous if the articles or the article stack are to be oriented, for example, against a stop on the bottom shelf.

It is favorable if at least a plurality of the transport loading aids each receive/transport exactly one article. In other words, the articles are stored in the transport loading aids in an article-specific manner. Thus, the picking operation can be carried out without complications, as in particular mix-ups when collecting or placing down an article can be avoided.

Lastly, it is also favorable if multiple dispatch packages are loaded into an outer package after packaging the articles in the dispatch packages. Thus, larger dispatch units can be assembled.

At this point, it should be noted that the variants and advantages disclosed for the presented storage and order-picking system can likewise refer to the presented method and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
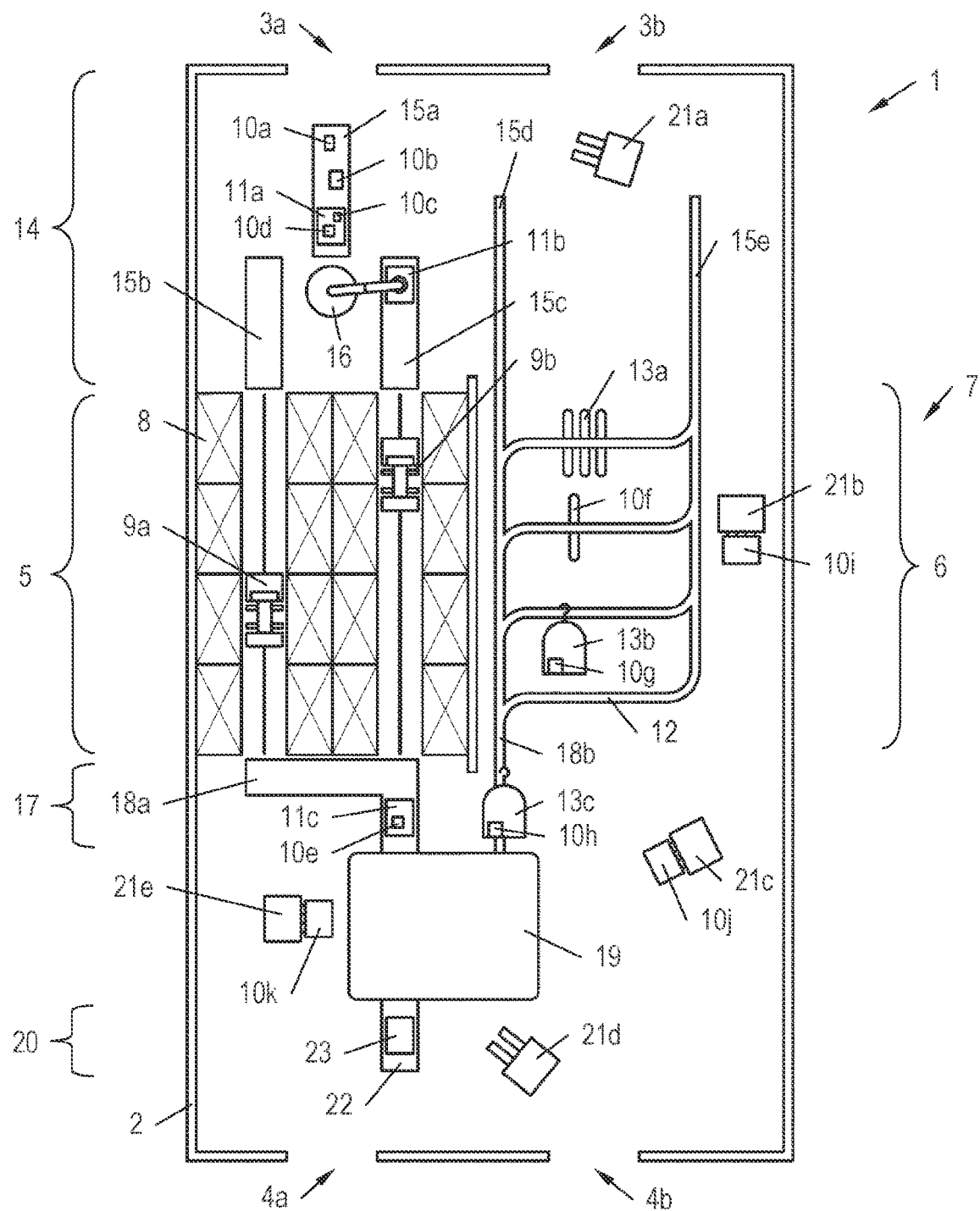
FIG. 1 a schematically shown storage and order-picking system in a top view.

FIG. 1 shows an exemplary storage and order-picking system 1, which comprises a building 2, which has goods-in areas 3a and 3b as well as goods-out areas 4a and 4b. The storage and order-picking system 1 further comprises a first storage zone 5 and a second storage zone 6, which together are part of the automated article storage 7.

The first storage zone 5 comprises storage racks 8 and storage and retrieval devices 9a and 9b which are movable between the storage racks 8. In the storage racks 8, articles 10a . . . 10e can be stored directly or by means of first transport loading aids 11a . . . 11c. In this regard, the first transport loading aids 11a . . . 11c can be configured in particular as trays, cardboard boxes or containers having a firm base and side walls.

The second storage zone 6 comprises storage overhead tracks 12, on which articles 10f . . . 10h can be stored directly or by means of second transport loading aids 13a . . . 13c, in this case by means of hanging bags 13a . . . 13c. If the articles 10f are stored directly on the storage overhead tracks 12, the articles 10f is present in the form of hanging articles, meaning, for example, in the form of articles of clothing suspended on clothes hooks. If the articles 10g . . . 10h are stored in the hanging bags 13a . . . 13c, they be present in virtually any form.

The storage and order-picking system 1 further comprises an automated storage conveyor system 14, which, in this example, has a first storage section 15a, a second storage section 15b and a third storage section 15c. The first storage section 15a connects the goods-in area 3a to a rearrangement robot 16. The second storage section 15b and the third storage section 15c connect the rearrangement robot 16 to the storage and retrieval devices 9a and 9b. On the first storage section 15a, two articles 10a, 10b are transported without first transport loading aids 11a ... 11c, two further articles 10c, 10d are transported with a first transport loading aid 11a.

On that end of the rack aisles which is opposite the automated storage conveyor system 14, a retrieval conveyor system 17 is provided, which, in this example, has a first retrieval section 18a, which connects the storage and retrieval devices 9a and 9b to a picking station 19 in respect of a conveying stream.

The automated storage conveyor system 14 further comprises a fourth storage section 15d and a fifth storage section 15e, which connect the goods-in area 3b to the second storage zone 6.

On that end of the second storage zone 6 which is opposite the automated storage conveyor system 14, the retrieval conveyor system 17 comprises a second retrieval section 18b, which connects the storage overhead tracks 12 to the picking station 19 in respect of a conveying stream.

The storage and order-picking system 1 also comprises a goods-out conveyor system 20, which connects the picking station 19 to the goods-out areas 4a and 4b. In the example shown, the goods-out conveyor system 20 comprises a goods-out area section 22 on which the dispatch package 23 is conveyed.

Lastly, the storage and order-picking system 1 has some autonomous mobile robots 21a ... 21e, which
  can convey articles 10i ... 10k from the goods-in area 3a to the storage and retrieval devices 9a and 9b or convey articles 10i ... 10k from the goods-in area 3b to the fourth storage section 15d or fifth storage section 15e and thus form a part of the automated storage conveyor system 14, and/or
  can convey articles 10i ... 10k from the storage and retrieval devices 9a and 9b to the picking station 19 or convey articles 10i ... 10k from the second retrieval section 18b to the picking station 19 and thus form a part of the retrieval conveyor system 17, and/or
  can convey articles 10i ... 10k from the goods-in area 3a or 3b to the picking station 19 and thus form a part of both the automated storage conveyor system 14 and the retrieval conveyor system 17 (conveying cross-docking articles), and/or
  can convey dispatch packages 23 from the picking station 19 to the goods-out area 4a, 4b and thus form a part of the goods-out conveyor system 20.

It is also conceivable that the storage and order-picking system 1 comprises a rearrangement conveyor system, not shown in FIG. 1, between the first storage zone 5 and the second storage zone 6, with which articles 10a ... 10k can be transferred between the two storage zones 5 and 6. In particular, articles 10a ... 10k can be retrieved from a first transport loading aid 11a ... 11c, for example a container, and transferred into a second transport loading aid 13a ... 13c, preferably a hanging bag, or vice versa. The rearrangement conveyor system may comprise a stationary conveying system and/or autonomous mobile robots 21a ... 21e.

The functioning of the storage and order-picking system 1 depicted in FIG. 1 is as follows:

Articles 10a ... 10b are delivered at the goods-in areas 3a and/or 3b and are stored in the first storage zone 5 and/or the second storage zone 6. For storing the articles 10a and 10b in the first article zone 5, they are placed directly on the first storage section 15a of the automated storage conveyor system 14, and/or articles 10c and 10d are placed on said first storage section 15a by means of a first transport loading aid 11a. The articles 10a ... 10d are subsequently transported to the rearrangement robot 16, which places them on the second storage section 15b or the third storage section 15c. In a further step, the articles 10a ... 10d are transported to the storage and retrieval devices 9a and 9b by means of the automated storage conveyor system 14 and are placed into storage in the storage racks 8 by storage and retrieval devices 9a and 9b.

When executing an order for picking articles, the assigned articles 10e is retrieved from the storage rack 8 by means of the storage and retrieval device 9a or 9b, transferred to the retrieval section 18a of the retrieval conveyor system 17 and transported on the retrieval section 18a to the picking station 19.

In the picking station 19, the article 10e is transferred/packed into a dispatch package 23, and subsequently, the dispatch package 23 is transported via the goods-out area section 22 of the goods-out conveyor system 20 to the goods-out area 4a. The processes in the picking station 19 are not shown in detail in FIG. 1, but are explained in detail in the figures below.

The process when placing in storage, storing, retrieving and picking articles 10f ... 10h, is similar to placing in storage, storing, retrieving and picking articles 10a ... 10e.

An article 10f can be transported via the fourth storage section 15d or the fifth storage section 15e onto a storage overhead track 12 of the second storage zone 6 and be stored there. In this regard, the article 10f can be transported directly on the overhead tracks of the fourth storage section 15d or of the fifth storage section 15e and/or be stored on the storage overhead track 12 or by means of a second transport loading aid 13a ... 13c, as it is shown in FIG. 1 for the articles 10g and 10h. In this example, the second transport loading aid 13a ... 13c is configured as a hanging bag.

At this point, it should be noted that in FIG. 1, the hanging bags 13b and 13c were rotated into the drawing plane for ease of representation. In reality the hanging bags 13b and 13c of course hang downwards.

When executing an order for picking articles, the assigned article 10h and/or the hanging bag 13c is transported via the second retrieval section 18b of the retrieval conveyor system 17 to the picking station 19. In the picking station 19, the article 10h is transferred/packed into a dispatch package 23. Subsequently, the dispatch package 23 is in turn transported via the goods-out area section 22 of the goods-out conveyor system 20 to the goods-out area 4a.

The articles 10a ... 10h may be transported, as described above, using a stationary conveying system or also by means of autonomous mobile robots 21a ... 21e as it is shown in FIG. 1. For example, an article 10f ... 10h can be transported, by means of a mobile robot 21a, from the goods-in area 3b to the fourth storage section 15d or the fifth storage section 15e. An article 10k can also be transported, by means of an autonomous mobile robot 21e, from the first storage zone 5 or from the second storage zone 6 to the picking station 19. It would also be conceivable that an article 10i is transported, using an autonomous mobile robot 21b, directly from the goods-in area 3a or 3b to the picking station 19 (cross-docking articles). Lastly, it is also conceivable that a dispatch package 23 is transported, by a mobile robot 21d, from the picking station 19 to the goods-out area 4a or 4b. The articles 10i ... 10k can be conveyed by the mobile robots 21a ... 21e, as described above, without first transport loading aids 11a ... 11c or without second transport loading aids 13a ... 13c or also with first transport loading aids 11a ... 11c or with second transport loading aids 13a ... 13c.

Figure 2:
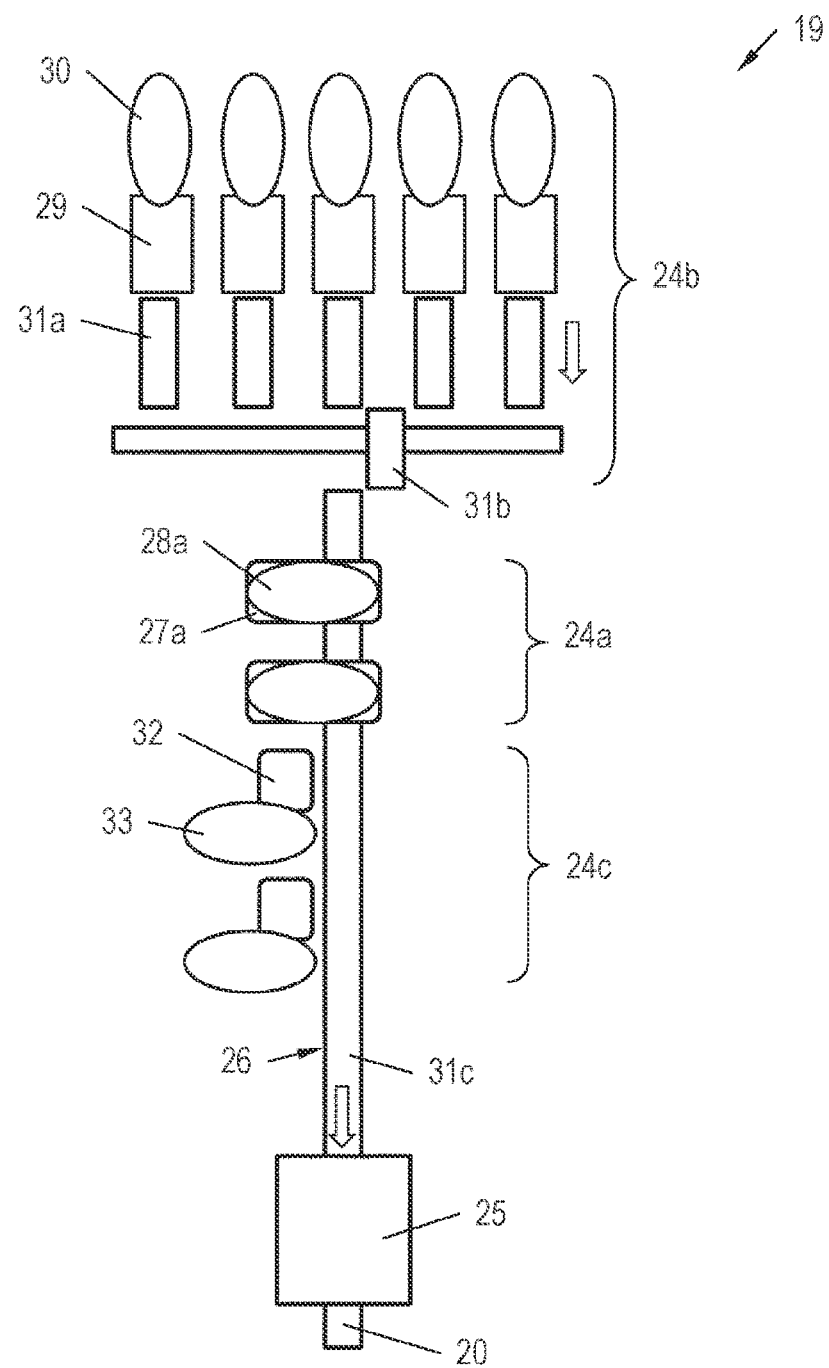
FIG. 2 an embodiment of a schematically shown picking station in a top view.

FIG. 2 shows an exemplary embodiment of the picking station 19 in a detailed view. As shown in FIG. 1, the picking station 19 is connected, in respect of a conveying stream, to the automated article storage 7 via the retrieval conveyor system 17, in order to allow the automatic transport of the articles 10a . . . 10k from the automated article storage 7 to the picking station 19. The picking station 19 is also connected, in respect of a conveying stream, to the goods-out area 4a, 4b via the goods-out conveyor system 20, in order to allow the automatic transport of the packaged articles 10a . . . 10k/dispatch packages 23 from the picking station 19 to the goods-out area 4a, 4b. The goods-out conveyor system 20 is preferably a goods-out conveyor system operated in an automated manner. This comprises for example a "stationary conveying system" and "conveying vehicles operated in an automated manner". Alternatively, the goods-out conveyor system 20 may also (partly or completely) be a manually operated goods-out conveyor system.

The picking station 19 preferably comprises multiple possibilities for picking articles 10a . . . 10h, namely a first symbolically shown picking zone 24a, a second symbolically shown picking zone 24b and a third symbolically shown picking zone 24c. FIG. 2 further shows an automated packaging machine 25, a feed conveyor system 26 leading to the automated packaging machine 25, and the goods-out conveyor system 20 leading away from the automated packaging machine 25. The feed conveyor system 26 and/or goods-out conveyor system 20 comprises a stationary conveying system (for example roller conveyors, belt conveyors, chain conveyors and the like) and/or one or multiple mobile robots 21a . . . 21e (also see FIG. 12).

By way of example, the first picking zone 24a comprises two of the first automated article discharging devices 27a shown in FIG. 2, each of which have a bottom shelf 28a visible in FIG. 2. However, the first picking zone 24a may also comprise a different number of automated article discharging devices 27a, in particular only one automated article discharging device 27a operated in an automated manner. The first picking zone 24a and its function are explained in detail in FIG. 3.

For example, the second picking zone 24b comprises multiple automated reloading devices 29 and multiple bottom shelves 30 of the reloading device arranged in the operating range of the reloading devices 29. In this case, the feed conveyor system 26 comprises multiple first feed conveying sections 31a in the operating range of the reloading devices 29, a second feed conveying section 31 connecting them in respect of a conveying stream, which is connected to a third feed conveying section 31c, which in turn is coupled with the automated packaging machine 25. In this example, the second feed conveying section 31b comprises a trolley traveling on a rail, but it could also be configured differently.

The second picking zone 24b may, however, also comprise a different number of automated reloading devices 29. The second picking zone 24b may in particular comprise only one automated reloading device 29. In this case, there is only a single first feed conveying section 31a, which is coupled with the third feed conveying section 31c, or only the third feed conveying section 31c, which connects the reloading device 29 and the automated packaging machine 25 in respect of a conveying stream. The one first feed conveying section 31a or the multiple first feed conveying sections 31a and/or the second feed conveying section 31b and/or the third feed conveying section 31c may comprise a stationary conveying system (for example roller conveyors, belt conveyors, chain conveyors and the like) and/or one or multiple mobile robots 21a . . . 21e (also see FIG. 12). The second picking zone 24a and its function are explained in detail in FIG. 4.

For example, the third picking zone 24c comprise multiple working areas 32 for pickers as well as multiple bottom shelves 33 of the picking working area. The third picking zone 24c may, however, also comprise a different number of working areas 32 for pickers and a different number of bottom shelves 33 of the picking working area. In particular, the third picking zone 24c may comprise only one working area 32 for a picker and one bottom shelf 33 of the picking working area. The third picking zone 24c and its function are explained in detail in FIG. 5.

The picking station 19 shown in FIG. 2 may alternatively comprise only the picking zone 24a described above or only the picking zone 24b or only the picking zone 24c or any desired combination of the picking stations 24a . . . 24c described above, for example the picking zone 24a and 24b.

Figure 3:
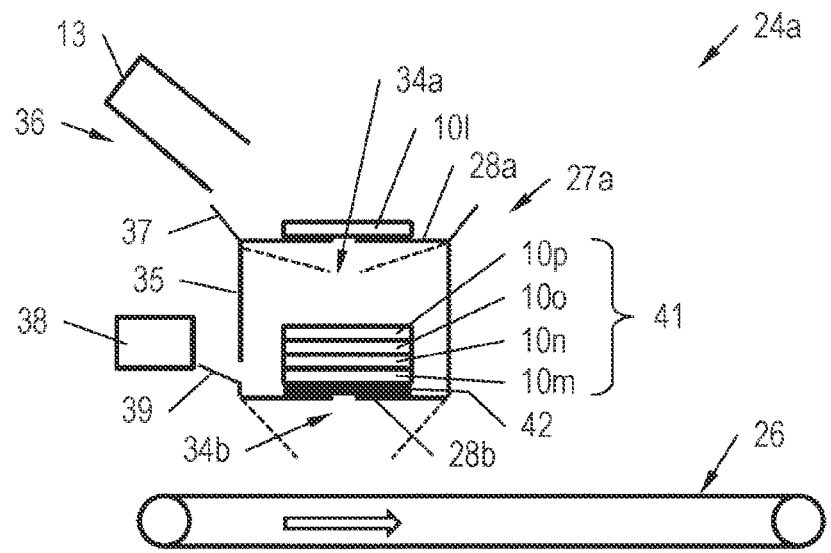
FIG. 3 a first schematically shown picking zone with two bottom shelves of an article discharging device arranged on top of each other, in a side view.

FIG. 3 shows the first picking zone 24a in detail. The first picking zone 24a comprises a first automated article discharging device 27a with a first bottom shelf 28a and a second bottom shelf 28b arranged below it. The second bottom shelf 28b is arranged above the feed conveyor system 26. The two bottom shelves 28a and 28b of the article discharging device are formed by movable flaps, whereby a first bottom opening 34a can be opened in the first bottom shelf 28a and a second bottom opening 34b is releasable in the second bottom shelf 28b. The two bottom shelves 28a and 28b are connected by shaft walls 35 and/or surrounded by them. The first automated article discharging device 27a furthermore comprises an automated unloading device 36, not shown in detail, and a conveying device 37, for example in the form of a slide. Lastly, the first picking zone 24a also comprises an optional printer 38, which is connected, in respect of a conveying stream, to the second bottom shelf 28b via a slide 39.

The functioning of the first picking zone 24a depicted in FIG. 3 is as follows:

First transport loading aids 11a . . . 11c and/or second transport loading aids 13a . . . 13c, as described for FIG. 1, are transported to the picking station 19 via the retrieval conveyor system 17 (not explicitly shown in FIG. 3). In the embodiment shown in FIG. 3, second transport loading aids 13 are supplied, which are specifically configured as hanging bags.

The hanging bag 13 is automatically unloaded by means of the automated unloading device 36 (unloading station). According to a first embodiment described in AT 50320/2018 (WO 2019/195871 A1), in a first step i), the hanging bag 13 is adjusted at the automated unloading device 36 (unloading station) from a closed position to an opened position, and in a second step ii), the hanging bag 13 is tilted from a provisioning position into an unloading position about a tilting axis extending substantially parallel to the longitudinal extension of an overhead conveyor system, whereby the article 10l . . . 10p is discharged from the hanging bag 13 through an unloading opening. According to a second embodiment described in WO 2018/130712 A2, in a first step i), the hanging bag 13 is adjusted at the automated unloading device 36 (unloading station) from a closed position to an opened position, and in a second step ii), a bottom of the hanging bag 13 is inclined out of a transport position, in which the article 10l . . . 10p is transported in the hanging bag 13, into an ejection position, in which the article 10l . . . 10p can be ejected from the hanging bag 13. In the ejection position a rear region of the bottom positioned opposite the unloading opening is positioned higher than a front region of the bottom, and the article 10*l* . . . 10*p* slides out of the hanging bag 13. According to a third embodiment, in a first step i), the hanging bag 13 is adjusted at the automated unloading device 36 (unloading station) from a closed position into an opened position, and in a second step ii), the article 10*l* . . . 10*p* is retrieved from the hanging bag 13 by a robot having a suction gripper.

With respect to the different embodiments of the automated unloading device 36, the detailed disclosure of AT 50320/2018 (WO 2019/195871 A1) and/or WO 2018/130712 A2 and/or WO 2014/044601 A1 is made the subject of this disclosure. According to each of these embodiments, the article 10*l* is automatically discharged from the hanging bag 13 and fed to the first bottom shelf 28*a*. In this process, the article 10*l* is discharged onto the optional conveying device 37, for example a slide, and conveyed, via the conveying device 37, onto the first bottom shelf 28*a*. However, it is also conceivable that the article 10*l* is discharged directly (meaning without the aid of a conveying device 37) onto the first bottom shelf 28*a*.

The described procedure generally works equally for first transport loading aids 11*a* . . . 11*c*, which are configured as rigid containers, wherein in that case, only the automated unloading device 36 (unloading station) for automatic unloading of the container is designed according to a different embodiment. For example, the automated unloading device 36 comprises a tilting device, by means of which the container is tilted from a provisioning position into an unloading position about a tilting axis extending substantially parallel to the longitudinal edge, whereby the article 10*l* . . . 10*p* is discharged from the container. Likewise, container having a bottom that can be opened and closed may be used, wherein the automated unloading device 36 (unloading station) then comprises an actuation device for opening and closing the bottom. Otherwise, the article 10*l* . . . 10*p* may be removed from the container by means of a robot having suction grippers, as described for example in AT 519 452 B1.

According to each of these embodiments, the article 10*l* is automatically discharged from the container and fed to the first bottom shelf 28*a*. Here, the article 10*l* is discharged onto the optional conveying device 37, for example a slide, and conveyed, via the conveying device 37, onto the first bottom shelf 28*a*. However, it is also conceivable that the article 10*l* is discharged directly (meaning without the aid of a conveying device 37) onto the first bottom shelf 28*a*.

If the article 10*l* on the first bottom shelf 28*a* is positioned correctly, the assigned flaps are pivoted downwards and release the first bottom opening 34*a*, so that the article 10*l* falls onto the article stack 41. In this case, a dispatch document 42 generated by the printer 38 in an optional first step was placed under the article stack 41, which dispatch document 42 slid, after being printed, via the slide 39 onto the second bottom shelf 28*b*. The article stack 41 itself comprises an article 10*m*, an article 10*n*, an article 10*0* and an article 10*p*, which have been stacked on top of each other on the second bottom shelf 28*b* and/or on the dispatch document 42 in multiple successive steps by opening the first bottom opening 34*a*. In this process, one article 10*m* . . . 10*p* at a time was placed on the first bottom shelf 28*a* by unloading a hanging bag 13 and dropped onto the article stack 41 by opening the first bottom opening 34*a*.

Once the article stack 41 is complete, it is discharged onto the feed conveyor system 26 by pivoting the flaps of the second bottom shelf 28*b* and thus by opening the second bottom opening 34*b*. Subsequently, the feed conveyor system 26 transports the article stack 41 together with the dispatch document 42 to the automated packaging machine 25, where the article stack 41 and the dispatch document 42 are packaged in a dispatch package 23. The dispatch package 23 is then transported in the manner described above via the goods-out conveyor system 20 to the goods-out area 4*a*, 4*b*.

Figure 4:
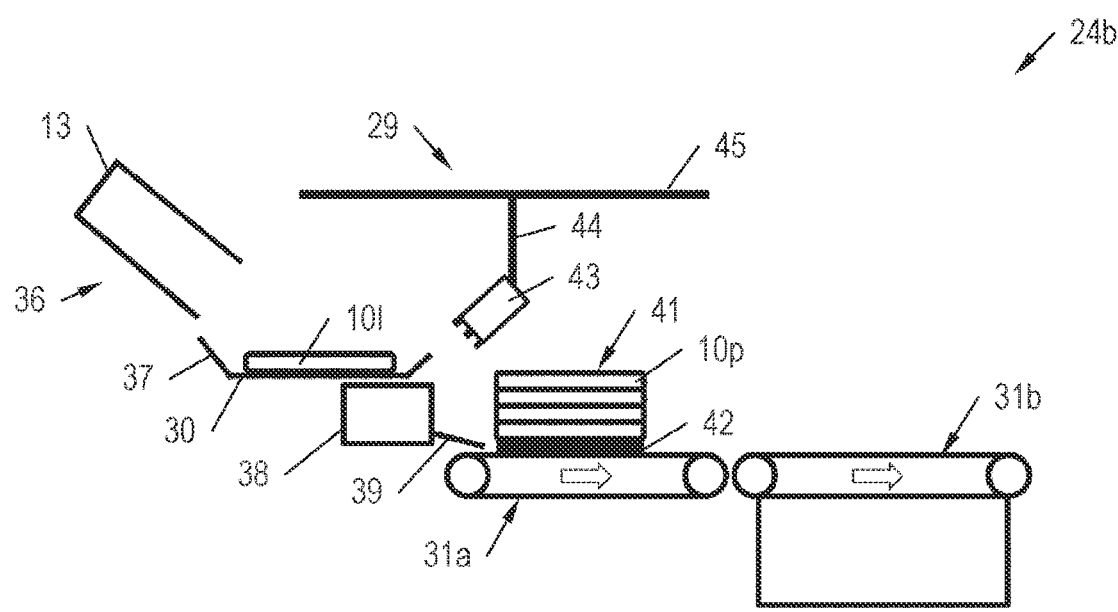
FIG. 4 a second schematically shown picking zone with an automated reloading device (here a gantry robot), in a side view.

FIG. 4 shows the second picking zone 24*b* in a detailed view. The automated unloading device 36 (unloading station) for automatically unloading the first transport loading aid 11*a* . . . 11*c* and/or second transport loading aid 13*a* . . . 13*c* may be designed according to the embodiments described for FIG. 3. The second picking zone 24*b* comprises a reloading device 29, which, in this specific example, is configured as a gantry robot. In this example, the gantry robot 29 has a suction gripper 43, which is mounted so as to be movable on a robot arm 44. The robot arm 44 is in turn mounted on a portal 45 so as to be displaceable. Furthermore, the second picking zone 24*b* comprises the bottom shelf 30 of the automated reloading device, a conveying device 37 connected to the bottom shelf 30 of the automated reloading device, which conveying device 37 is again configured as a slide in this specific example, an optional printer 38 with a slide 39, and the first feed conveying section 31*a* and the second feed conveying section 31*b* of the feed conveyor system 26.

The functioning of the picking zone 24*b* shown FIG. 4 is as follows:

In an optional first step, the printer 38 again generates a dispatch document 42, which slides via the slide 39 into a predefined position on the first feed conveying section 31*a*. In individual, successive steps, the article stack 41 is formed. For this purpose, one article 10*l* at a time is automatically unloaded from the hanging bag 13 or the container at the automated unloading device 36 and fed to the bottom shelf 30 of the automated reloading device. In this process, the article 10*l* is discharged onto the optional conveying device 37, for example a slide, and conveyed, via the conveying device 37, onto the bottom shelf 30 of the automated reloading device. However, it is also conceivable that the article 10*l* is discharged directly (meaning without the aid of a conveying device 37) onto the bottom shelf 30 of the automated reloading device.

The article 10*l* is collected from the bottom shelf 30 of the automated reloading device by the suction gripper 43 of the gantry robot 29 and placed on the article stack 41. According to this embodiment, the article stack 41 is formed on the feed conveyor system 26. Once the article stack 41 is completed, it is transported, by means of the feed conveyor system 26, together with the dispatch document 42 to the automated packaging machine 25. If the feed conveyor system 26 comprises the feed conveying sections 31*a* . . . 31*c*, the article stack 41 with the dispatch document 42 is transported through the first feed conveying section 31*a* to the second feed conveying section 31*b* and is transported from there to the automated packaging machine 25 by means of the third feed conveying section 31*c*. The article stack 41 and the dispatch document 42 are packaged in a dispatch package 23 in the automated packaging machine 25. The dispatch package 23 is subsequently transported via the goods-out conveyor system 20 to the goods-out area 4*a*, 4*b*.

At this point, it should be noted that the bottom shelf 30 of the automated reloading device may be omitted when using first transport loading aids 11*a* . . . 11*c*, if the articles 10*a* . . . 10*k* are not discharged from the first transport loading aids 11*a* . . . 11*c* onto the bottom shelf 30 of the automated reloading device but the first transport loading aids 11*a* . . . 11*c* are instead supplied in the operating range of the reloading device 29. From this supply position, the articles 10a . . . 10k can be retrieved by the reloading device 29 directly from the first transport loading aids 11a . . . 11c and fed to the feed conveyor system 26. Such an embodiment is particularly advantageous if the first transport loading aid 11a . . . 11c, in particular a container, is loaded with a plurality of articles 10a . . . 10k.

Figure 5:
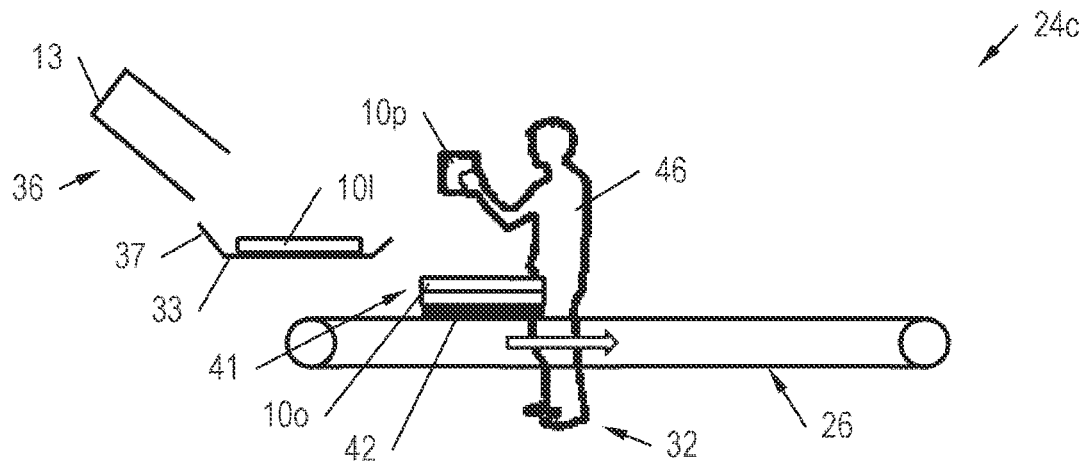
FIG. 5 a third schematically shown picking zone with a working area for a picking zone, in a side view.

FIG. 5 shows the third picking zone 24c in detail. The automated unloading device 36 (unloading station) for automatically unloading the first transport loading aid 11a . . . 11c and/or second transport loading aid 13a . . . 13c may again be designed according to the embodiments described for FIG. 3. The third picking zone 24c comprises a working area 32 for a picker 46 as well as a bottom shelf 33 of a picking working area in the operating range of the picker 46. The third picking zone 24c further comprises a conveying device 37 connected to the bottom shelf 33 of the picking working area, which conveying device 37 is again configured as a slide, as well as a feed conveyor system 26.

The process in the third picking zone 24c is the same as the process in the second picking zone 24b. One article 10l at a time is automatically unloaded from the hanging bag 13 or the container by means of the automated unloading device 36 and fed to the bottom shelf 33 of the picking working area. In this process, the article 10l is discharged onto the optional conveying device 37, for example a slide, and conveyed, via the conveying device 37, onto the bottom shelf 33 of the picking working area. However, it is also conceivable that the article 10l is discharged directly (meaning without the aid of a conveying device 37) onto the bottom shelf 33 of the picking working area.

The article 10l is collected from the bottom shelf 33 of the picking working area by the picker 46 and placed on the article stack 41. According to this embodiment, the article stack 41 is formed on the feed conveyor system 26. In this example, as well, there is an optional dispatch document 42 under the article stack 41. Once the article stack 41 is completed, it is transported together with the dispatch document 42 via the feed conveyor system 26 to the automated packaging machine 25. The article stack 41 and the dispatch document 42 are packaged in a dispatch package 23 in the automated packaging machine 25, which dispatch package 23 is transported via the goods-out conveyor system 20 to the goods-out area 4a, 4b.

The bottom shelf 33 of the picking working area may also be omitted when using first transport loading aids 11a . . . 11c, if the articles 10a . . . 10k are not discharged from the first transport loading aids 11a . . . 11c onto the bottom shelf 33 of the picking working area but the first transport loading aids 11a . . . 11c are instead supplied in the operating range of the picker 46. From this supply position, the articles 10a . . . 10k can be retrieved by the picker 46 directly from the first transport loading aids 11a . . . 11c and fed to the feed conveyor system 26. Such an embodiment is particularly advantageous if, for an order, the first transport loading aid 11a . . . 11c, in particular a container, contains either one single article or multiple articles in an order-specific manner.

Figure 6:
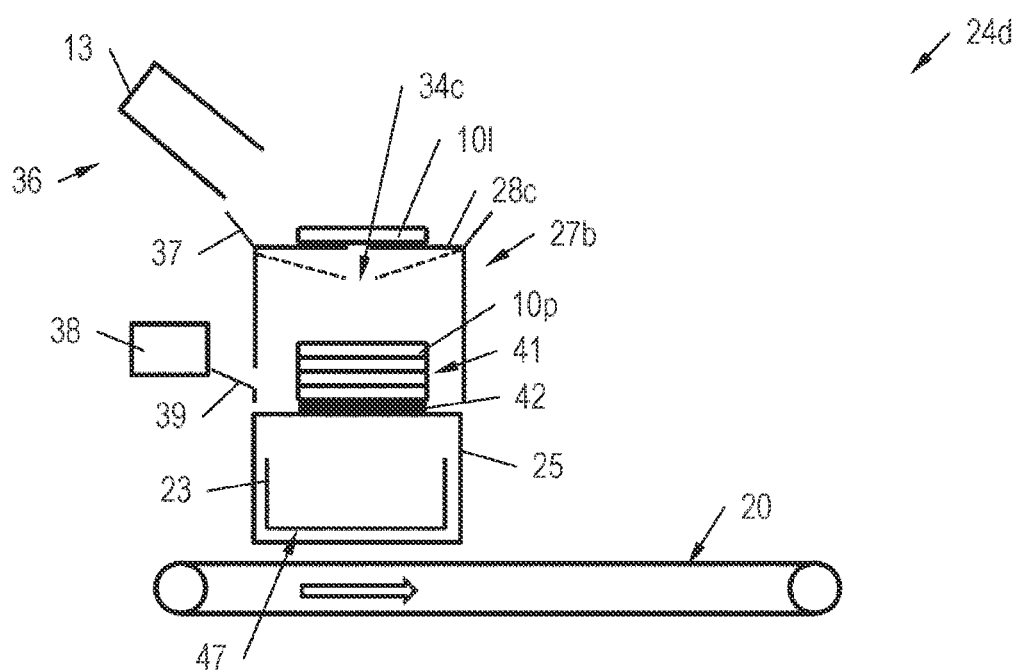
FIG. 6 a fourth schematically shown picking zone with a bottom shelf, which is arranged above an automated packaging machine, in a side view.

FIG. 6 shows an embodiment of a fourth picking zone 24d, which is not explicitly shown in FIG. 2. The automated unloading device 36 (unloading station) for automatically unloading the first transport loading aid 11a . . . 11c and/or second transport loading aid 13a . . . 13c may be designed according to the embodiments described for FIG. 3. The fourth picking zone 24d comprises a second automated article discharging device 27b with a third bottom shelf 28c, which comprises pivotable flaps, whereby a third bottom opening 34c can be released. The third bottom shelf 28c is again connected with a conveying device 37, which in this example is also configured as a slide. Moreover, the fourth picking zone 24d comprises an optional printer 38, which is coupled with the automated packaging machine 25 via a slide 39.

The functioning of the fourth picking zone 24d is as follows:

Via an automated unloading device 36 not explicitly shown in FIG. 6, an article 10l is automatically discharged from the hanging bag 13 or the container and fed to the bottom shelf 28c. In this process, the article 10l is discharged onto the optional conveying device 37, for example a slide, and conveyed, via the conveying device 37, onto the third bottom shelf 28c. However, it is also conceivable that the article 10l is discharged directly (meaning without the aid of a conveying device 37) onto the third bottom shelf 28c.

With the aid of the flaps of the third bottom shelf 28c, the article 10l can be dropped individually onto the article stack 41 formed on the automated packaging machine 25. In this example, as well, there is an optional dispatch document 42 under the article stack 41, which dispatch document 42 was printed by the printer 38 in a first step and slid via a slide 39 into the position above the automated packaging machine 25 shown in FIG. 6.

Once the article stack 41 is complete, it is conveyed into the automated packaging machine 25 together with the dispatch document 42, by a mechanism of the automated packaging machine 25 not explicitly shown in FIG. 6, and dropped there into a dispatch package 23, which is provided at a loading position 47.

As opposed to this, it is also possible that the article 10l falls directly into the dispatch package 23 provided at a loading position 47 and the article stack 41 is formed in the dispatch package 23. The optional dispatch document 42 is also packed directly into the dispatch package 23.

It is also possible for only a single article 10l to be discharged into the dispatch package 23 provided at a loading position 47, if an order requires only one article 10l.

Subsequently, the dispatch package 23 is transported in the manner described above via the goods-out conveyor system 20 to the goods-out area 4a, 4b.

In the example shown in FIG. 6, the article 10l contained in the hanging bag 13 or the container slides via the conveying device 37 onto the third bottom shelf 28c. However, it would also be conceivable that the article 10l is dropped directly onto the third bottom shelf 28c. The conveying device 37 is then obsolete. Moreover, the article stack 41 in the example shown in FIG. 6 is dropped directly into the automated packaging machine 25. However, it is also conceivable that the article stack 41 is transferred into the automated packaging machine 25 indirectly, for example via a conveying device (slide) similar to the conveying device 37.

Figure 7:
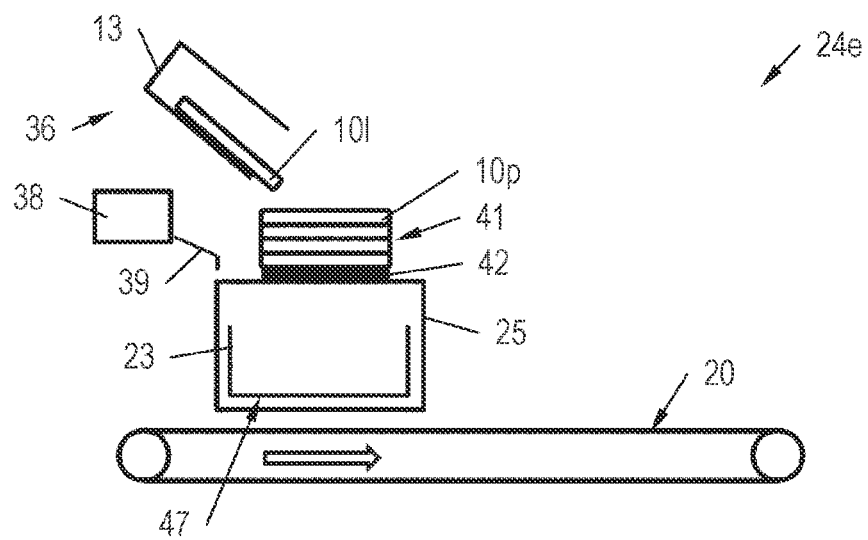
FIG. 7 a fifth schematically shown picking zone with an automated unloading device, which is arranged directly above an automated packaging machine, in a side view.

The fifth picking zone 24e shown by way of example in FIG. 7 has a similar structure as the fourth picking zone 24d shown in FIG. 6. In contrast to this, the fifth picking zone 24e, however, does not have a second automated article discharging device 27b. Upon the automatic unloading of the hanging bag 13 or the container by means of the automated unloading device 36, the article 10l is dropped directly onto the article stack 41 formed at the automated packaging machine 25. Alternatively, it may also be provided that the article 10l is discharged onto a conveying device 37 (not shown in FIG. 7) and is fed to the automated packaging machine 25 via a conveying device 37. In this example, as well, there is an optional dispatch document 42 under the article stack 41, which dispatch document 42 was printed by the printer 38 in a first step and slid via a slide 39 into the position above the automated packaging machine 25 shown in FIG. 7.

Once the article stack 41 is complete, it is conveyed into the automated packaging machine 25 together with the dispatch document 42, by a mechanism of the automated packaging machine 25 not explicitly shown in FIG. 7, and dropped there into a dispatch package 23, which is provided at a loading position 47.

In this embodiment, as well, it is again possible that the article 10*l* is discharged directly into the dispatch package 23 provided at a loading position 47 and prepared for closing, and the article stack 41 is formed in the dispatch package 23. The optional dispatch document 42 is also packed directly into the dispatch package 23. In this case, it would also be conceivable to use a conveying device 37, which discharges the article 10*l* into the dispatch package 23 provided at a loading position 47 and prepared for closing.

It is also possible for only a single article 10*l* to be discharged into the dispatch package 23 provided at a loading position 47, if an order requires only one article 10*l*.

Subsequently, the dispatch package 23 is transported in the manner described above via the goods-out conveyor system 20 to the goods-out area 4*a*, 4*b*.

The automated unloading device 36 (unloading station) for automatically unloading the first transport loading aid 11*a* . . . 11*c* and/or second transport loading aid 13*a* . . . 13*c* may again be designed according to the embodiments described for FIG. 3.

Figure 8:
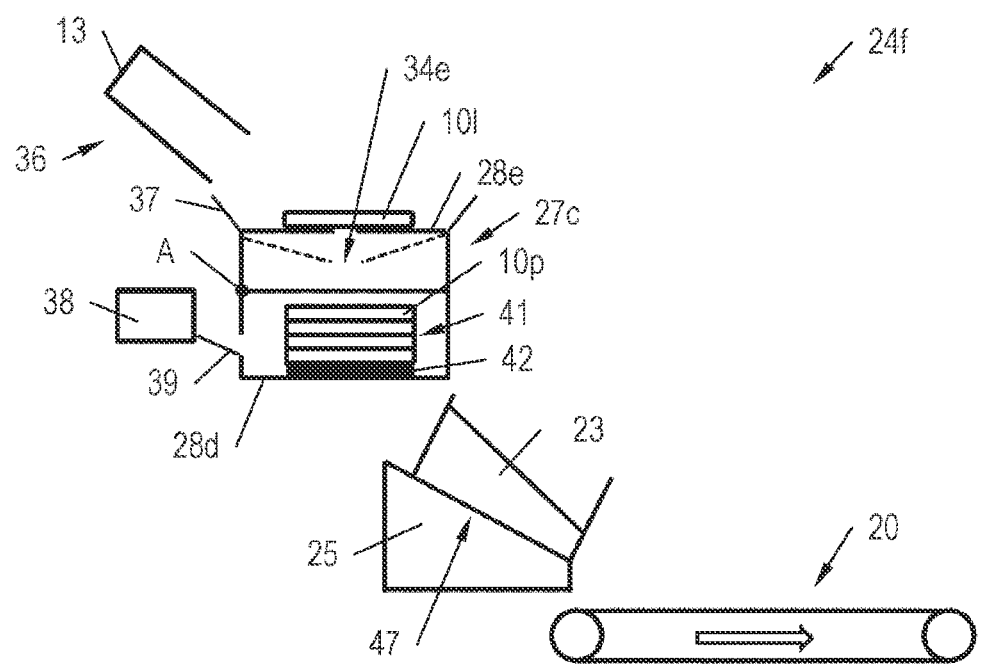
FIG. 8 a sixth schematically shown picking zone with a fourth automated bottom shelf, which fourth automated bottom shelf is pivotable in its entirety, in a substantially horizontal position, in a side view.

FIG. 8 shows a sixth picking zone 24*f*, depicted by way of example, which may combine some of the features of the previously introduced picking zones 24*a* . . . 24*e*. Specifically, the sixth picking zone 24*f* again comprises an automated unloading device 36 (unloading station) for automatically unloading the first transport loading aid 11*a* . . . 11*c* and/or second transport loading aid 13*a* . . . 13*c*, which may be designed according to the embodiments described for FIGS. 3 to 7.

The sixth picking zone 24*f* comprises a fourth automated bottom shelf 28*d*, which is pivotable about a pivot point A into an essentially horizontal position and an inclined position (particularly such that a trajectory on the fourth automated bottom shelf 28*d* points in the conveying direction). Moreover, the sixth picking zone 24*f* has an optional third automated article discharging device 27*c* which is arranged above the fourth automated bottom shelf 28*d* of the article discharging device, which third automated article discharging device 27*c* has a fifth bottom shelf 28*e* having a closable fifth bottom opening 34*e*. The fifth bottom shelf 28*e* is again connected with a conveying device 37, which in this example is also configured as a slide. Moreover, the sixth picking zone 24*f* comprises an optional printer 38, which is coupled with the fifth bottom shelf 28*e* via a slide 39.

Below the fourth automated bottom shelf 28*d*, offset in the conveying direction, an automated packaging machine 25 having an inclined base is arranged, on which a dispatch loading aid 23 having an opening pointing in the direction of the fourth automated bottom shelf 28*d* is arranged. In this regard, the dispatch loading aid 23 is held in position by holders of the automated packaging machine 25 and extends obliquely downwards. The inclined base, however, is not obligatorily required and may also be omitted. In this case, the dispatch loading aid 23 is also held in position by holders of the automated packaging machine 25 and hangs down substantially vertically.

The functioning of the sixth picking zone 24*f* is as follows:

Via an automated unloading device 36 not explicitly shown in FIG. 8, an article 10*l* is automatically discharged from the hanging bag 13 or the container and fed to the fifth bottom shelf 28*e*. In this process, the article 10*l* is discharged onto the optional conveying device 37, for example a slide, and conveyed, via the conveying device 37, onto the fifth bottom shelf 28*e*. However, it is also conceivable that the article 10*l* is discharged directly (meaning without the aid of a conveying device 37) onto the fifth bottom shelf 28*e*.

With the aid of the flaps of the fifth bottom shelf 28*e*, the article 10*l* can be dropped individually onto the article stack 41 formed on the fourth automated bottom shelf 28*d*. In this example, as well, there is an optional dispatch document 42 under the article stack 41, which dispatch document 42 was printed by the printer 38 in a first step and slid via a slide 39 into the position shown in FIG. 8.

Figure 9:
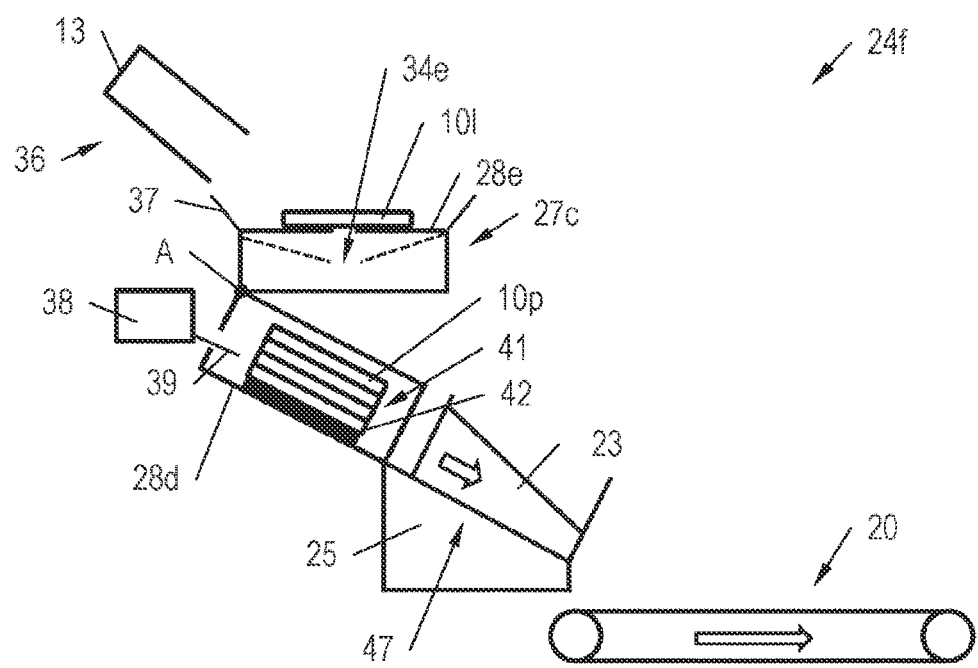
FIG. 9 the sixth picking zone from FIG. 8 with the fourth automated bottom shelf in an inclined position.

Once the article stack 41 is complete, it is forwarded by pivoting the fourth automated bottom shelf 28*d* about the pivot point A from the substantially horizontal position shown in FIG. 8 into an inclined position. This state is depicted in FIG. 9. In this process, the article stack 41 does not fall downwards vertically but slides across the inclined fourth automated bottom shelf 28*d*. Thereby the article stack 42 remains more stable during transfer.

The article stack 41 slides from the fourth automated bottom shelf 28*d* into the dispatch loading aid 23, which is provided on the inclined base of the automated packaging machine 25 and points with an opening in the direction of the fourth automated bottom shelf 28*d*. The dispatch loading aid 23 can thus be loaded more easily. In particular, the article stack 41 can remain more stable. Particularly plastic bags ("polybags") are suitable as dispatch loading aids 23. This embodiment variant may, however, also generally be applied to other dispatch loading aids 23, such as cone-shaped or box-shaped cardboard box packagings.

Subsequently, the dispatch package 23 can be transported in the manner described above via the goods-out conveyor system 20 to the goods-out area 4*a*, 4*b*.

An optional banding machine (not shown) may also be situated upstream of the provision location for the dispatch loading aid 23, which banding machine wraps a band around the article stack 41 and thus secures the same.

An optional slide (not shown) may also be arranged between the inclined base of the automated packaging machine 25 and the fourth automated bottom shelf 28*d*, whereby the fourth automated bottom shelf 28*d* can be easily connected, in respect of a conveying stream, to the automated packaging machine 25.

In the example shown in FIGS. 8 and 9, the article 10*l* contained in the hanging bag 13 or the container slides via the conveying device 37 onto the fifth bottom shelf 28*e*. However, it would also be conceivable that the article 10*l* is dropped directly onto the fifth bottom shelf 28*e*. The conveying device 37 is then obsolete. It would further be conceivable that the fifth bottom shelf 28*e* (by means of which the article 10*l* coming from the hanging bag 13 is pre-positioned, so that the article stack 41 may be formed more exactly) is omitted, and the article 10*l* slides via the conveying device 37 onto the fourth automated bottom shelf 28*d* and/or the article stack 41 formed there. However, it would also be conceivable that the article 10*l* is dropped directly onto the fourth automated bottom shelf 28*d* and/or the article stack 41 formed there.

At this point, it should be noted that the fourth automated bottom shelf 28*d*, which is pivotable about a pivot point A in a substantially horizontal and an inclined position, is not limited to the embodiment according to the sixth picking zone 24*f* but for example may also be provided in the first picking zone 24*a* shown in FIG. 3 instead of the second bottom shelf 28*d*.

In all examples, the picking station 19 has an automated packaging machine 25, as well as a goods-out conveyor system 20 operated in an automated manner, which is connected, in respect of a conveying stream, to the automated packaging machine 25 on the output side.

In a case a), which is shown in FIG. 3, the picking station 19 further comprises an automated feed conveyor system 26 for feeding the automated packaging machine 25, which is connected, in respect of a conveying stream, to the automated packaging machine 25 on the input side, a first automated article discharging device 27*a*, which is assigned to the automated feed conveyor system 26, having a first bottom shelf 28*a* with a first closable bottom opening 34*a*, and a second bottom shelf 28*b* a second closable bottom opening, wherein the first bottom shelf 28*a* is arranged above the second bottom shelf 28*b* and the second bottom shelf 28*b* is arranged above the feed conveyor system 26.

In a case b), which is shown in FIG. 4, the picking station 19 comprises an automated reloading device 29, an automated feed conveyor system 26 for feeding the feed conveyor system 25, which is connected, in respect of a conveying stream, to the automated packaging machine 25 on the input side and which extends in the operating range of the reloading device 29, as well as a bottom shelf 30 of the automated reloading device in the operating range of the reloading device 29.

In a case c), which is shown in FIG. 6, the picking station 19 has a second automated article discharging device 27*b*, which is assigned to the automated packaging machine 25, which has a third bottom shelf 28*c* arranged above a loading position of the automated packaging machine 25, with a closable third bottom opening 34*c*, wherein a dispatch package 23 prepared for closing can be provided at the loading position 47.

In a case d), which is shown in FIGS. 7 to 9, the picking station 19 comprises an automated unloading device 36, which is assigned to the automated packaging machine 25 for automatically providing a hanging bag 13 or a container above a loading position 47 of the automated packaging machine 25 and for automatically discharging an article 10*a* . . . 10*p* from the hanging bag 13 or a container into a dispatch package 23 provided at the loading position 47 and prepared for closing.

In the examples shown, the retrieval conveyor system 17,
- in case a) and/or in the first picking zone 24*a* shown in FIG. 3, is connected, in respect of a conveying stream, to the first bottom shelf 28*a*,
- in case b) and/or in the second picking zone 24*b* shown in FIG. 4, is connected, in respect of a conveying stream, to the bottom shelf 30 of the automated reloading device,
- in the third picking zone 24*c* shown in FIG. 5, is connected, in respect of a conveying stream, to the bottom shelf 33 of the picking working area,
- in case c) and/or in the fourth picking zone 24*d* shown in FIG. 6, is connected, in respect of a conveying stream, to the third bottom shelf 28*c*, and
- in case d) and/or in the fifth picking zone 24*e* and sixth picking zone 24*f* shown in FIGS. 7 to 9, is connected, in respect of a conveying stream, to the automated packaging machine 25.

There is an automated unloading device 36 for automatically unloading a transport loading aid 11*a* . . . 11*c*, 13*a* . . . 13*c* in the course of the retrieval conveyor system 17, which transport loading aid 11*a* . . . 11*c*, 13*a* . . . 13*c* in case a) and/or in the first picking zone 24*a* shown in FIG. 3, is connected, in respect of a conveying stream, to the first bottom shelf 28*a*, in case b) and/or in the second picking zone 24*a* shown in FIG. 4, is connected, in respect of a conveying stream, to the bottom shelf 30 of the automated reloading device, in the third picking zone 24*c* shown in FIG. 5, is connected, in respect of a conveying stream, to the bottom shelf 33 of the picking working area, in case c) and/or in the fourth picking zone 24*d* shown in FIG. 6, is connected, in respect of a conveying stream, to the third bottom shelf 28*c*, and in case d) and/or in the fifth picking zone 24*e* and sixth picking zone 24*f* shown in FIGS. 7 to 9, is connected, in respect of a conveying stream, to a dispatch package 23 provided at the loading position 47 and prepared for closing.

In the specific example shown, the automated unloading device 36,
- in case a) and/or in the first picking zone 24*a* shown in FIG. 3, is configured to automatically discharge the article 10*a* . . . 10*p* from the transport loading aid 11*a* . . . 11*c*, 13*a* . . . 13*c* onto a conveying device 37 (a slide in this case), and the conveying device 37 is configured to automatically discharge the article 10*a* . . . 10*p* onto the first bottom shelf 28*a*,
- in case b) and/or in the second picking zone 24*b* shown in FIG. 4, is configured to automatically discharge the article 10*a* . . . 10*p* from the transport loading aid 11*a* . . . 11*c*, 13*a* . . . 13*c* onto a conveying device 37 (a slide in this case), and the conveying device 37 is configured to automatically discharge the article 10*a* . . . 10*p* onto the bottom shelf 30 of the automated reloading device,
- in the case of the third picking zone 24*c* shown in FIG. 5, is configured to automatically discharge the article 10*a* . . . 10*p* from the transport loading aid 11*a* . . . 11*c*, 13*a* . . . 13*c* onto a conveying device 37 (a slide in this case), and the conveying device 37 is configured to automatically discharge the article 10*a* . . . 10*p* onto the bottom shelf 33 of the picking working area, and
- in case c) and/or in the first picking zone 24*d* shown in FIG. 6, is configured to automatically discharge the article 10*a* . . . 10*p* from the transport loading aid 11*a* . . . 11*c*, 13*a* . . . 13*c* onto a conveying device 37 (a slide in this case), and the conveying device 37 is configured to automatically discharge the article 10*a* . . . 10*p* onto the third bottom shelf 28*c*.

In the specific examples shown, the article 10*a* . . . 10*p* is thus discharged indirectly. However, it would also be conceivable that the conveying device/slide 37 is omitted and the article 10*a* . . . 10*p* is discharged directly.

In this case, the automated unloading device 36 would be,
- in case a) and/or in the first picking zone 24*a* shown in FIG. 3, arranged above the first bottom shelf 28*a* and configured to automatically discharge the article 10*a* . . . 10*p* from the transport loading aid 11*a* . . . 11*c*, 13*a* . . . 13*c* onto the first bottom shelf 28*a*,
- in case b) and/or in the second picking zone 24*b* shown in FIG. 4, arranged above the bottom shelf 30 of the automated reloading device and configured to automatically discharge the article 10*a* . . . 10*p* from the transport loading aid 11*a* . . . 11*c*, 13*a* . . . 13*c* onto the bottom shelf 30 of the automated reloading device,
- in the case of the third picking zone 24*c* shown in FIG. 5, arranged above the bottom shelf 33 of the picking working area and configured to automatically discharge the article 10a ... 10p from the transport loading aid 11a ... 11c, 13a ... 13c onto the bottom shelf 33 of the picking working area, in case c) and/or in the fourth picking zone 24d shown in FIG. 6, arranged above the third bottom shelf 28c and configured to automatically discharge the article 10a ... 10p from the transport loading aid 11a ... 11c, 13a ... 13c onto the third bottom shelf 28c.

In case d) and/or in the fifth picking zone 24e shown in FIG. 7, the automated unloading device 36 is arranged above the automated packaging machine 25 (specifically above the loading position 47) and configured to automatically discharge an article 10a ... 10p from the first transport loading aid 11a ... 11c, 13a ... 13c into the automated packaging machine 25, in particular directly into a dispatch package 23 provided directly at the loading position 47 and prepared for closing (direct discharge of the article 10a ... 10p).

However, it would also be conceivable that the fifth picking zone 24 is configured for indirectly discharging the article 10a ... 10p into the automated packaging machine 25 and/or into the dispatch package 23. In this case, the automated unloading device 36 is configured for automatically discharging the article 10a ... 10p from the transport loading aid 11a ... 11c, 13a ... 13c onto a conveying device 37 (for example a slide), and the conveying device 37 is configured for automatically discharging the article 10a ... 10p into the automated packaging machine 25.

In case b) and/or in the second picking zone 24b shown in FIG. 4, the picking station 19 has a plurality of automated reloading devices 29, and the feed conveyor system 26 comprises multiple first feed conveying sections 31a in the operating range of the plurality of reloading devices 29. The picking station 19 in the case described further comprises a second feed conveying section 31b connected to the first feed conveying sections 31a in respect of a conveying stream, which second feed conveying section 31b is connected to the third feed conveying section 31c, which, in turn, is coupled with the automated packaging machine 35. However, it is also conceivable that the picking zone 24b has a different number of reloading devices 29, in particular only one reloading device 29. It is further conceivable that the feed conveyor system 26 is structured differently and has a different number of feed conveying sections 31a ... 31c, in particular only one first feed conveying section 31a.

In case b) and/or in the second picking zone 24b shown in FIG. 4, the reloading device 29 is further configured as a gantry robot and comprises a suction gripper 43. Yet it is also conceivable that the reloading device 29 is configured as an articulated-arm robot. It is further conceivable that the reloading device 29 has a mechanical gripper.

The printer 38 is optional in all of the examples and may be omitted. This also applies to the slide 39.

In the examples according to FIGS. 3 to 6, the second transport loading aids 13 are formed by hanging bags. Equivalently, instead of the second transport loading aid 13 in FIGS. 3 to 6, a first transport loading aid 11a ... 11c in the form of a rigid container, which is in particular stored and transported standing upright (not suspended), may also be provided.

In all of the examples, it is advantageous if each transport loading aid 11a ... 11c, 13a ... 13c collects and transports exactly one article 10a ... 10p. Yet it is also conceivable that each transport loading aid 11a ... 11c, 13a ... 13c collects and transports multiple articles 10a ... 10p.

Lastly, it is also conceivable that the dispatch package 23 is not transported to the goods-out area 4a, 4b and dispatched from there, but that multiple dispatch packages 23 are loaded, after packaging the articles 10a ... 10p in the dispatch package 23, into an outer package, which is subsequently dispatched.

In the examples shown in FIGS. 3 to 6, the conveying device 37 is formed by a (passive) slide. In the mentioned examples, the conveying device 37 may, however, also be configured differently, for example as a passive or active roller conveyor or as a conveyor belt. In particular, it is also conceivable that the spatial position of an articles 10a ... 10p on the conveying device 37 is changed in a targeted manner (in particular as needed). For example, the actual length of an article 10a ... 10p could be captured sensorially (for example by a camera) and be approximated to a target length by the conveying device 37. For example, an article 10a ... 10p can be rotated as needed.

A change in position of the article 10a ... 10p may of course take place on the automated storage conveyor system 14, the retrieval conveyor system 17, the feed conveyor system 26 and/or the goods-out conveyor system 20, even if this is not shown explicitly in the figures.

Furthermore, it is noted that any desired constellation of the picking zones 24a ... 24f is possible. For example, the picking station 19 may have only one type of picking zones 24a ... 24f, two types, three types or all four types. Furthermore, the picking station 19 may also have other types of picking zones 24a ... 24f that are not shown in the figures.

Furthermore, it is noted that articles 10a ... 10p of different article types can preferably or exclusively be transported to specific picking zones 24a ... 24f and be picked there. For example, articles 10a ... 10p, which are impossible or at least hard to pick automatically, can be transported to the third picking zone 24c shown in FIG. 5 and be picked there, whereas articles 10a ... 10p, which can easily be picked automatically, are transported to the second picking zone 24b shown in FIG. 4 and are picked there. Articles 10a ... 10p fitting well through the first or second automated article discharging device 27a, 27b can be transported to the first picking zone 24a shown in FIG. 3, or can be transported to the fourth picking zone 24d shown in FIG. 6, and be picked there, whereas other articles 10a ... 10p are transported to the third picking zone 24c shown in FIG. 5 or to the second picking zone 24b shown in FIG. 4 and be picked there, and so on.

Even though it is not explicitly shown, it should be noted at this point that the first transport loading aids 11a ... 11c and/or second transport loading aids 13, 13a ... 13c can be loaded automatically at a loading station. If the second transport loading aid 13, 13a ... 13c is designed as a hanging bag, a loading station as described in WO 2018/130712 A2 or WO 2014/044601 A1 may be used for the automatic loading of the hanging bag 13, 13a ... 13c.

Figure 10:
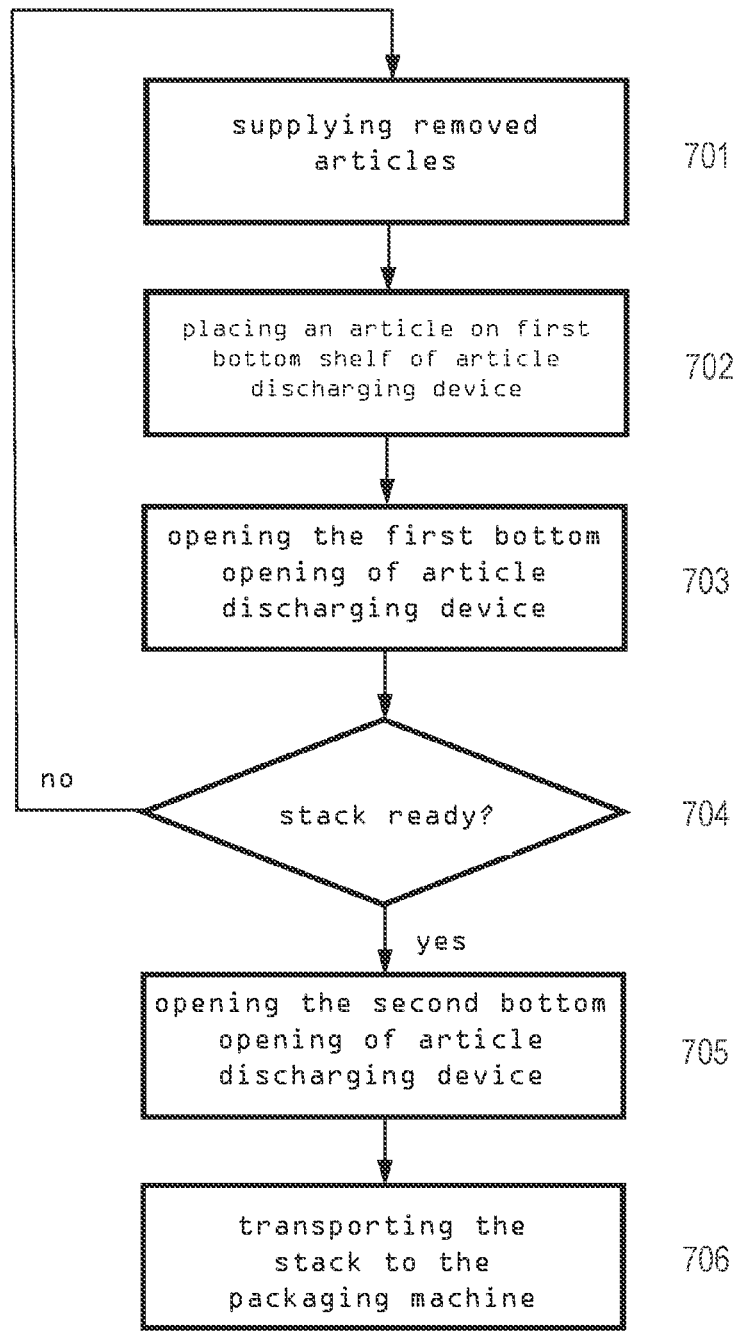
FIG. 10 an exemplary flowchart for the operation of a picking zone according to FIG. 3.

FIG. 10 shows an exemplary flowchart of the process taking place in case a) and/or in the first picking zone 24a shown in FIG. 3.

In a first step 701, an article 10a ... 10p is supplied at the picking station 19 via the retrieval conveyor system 17. In a further step 702, the article 10a ... 10p is transferred from the hanging bag 13 to the first bottom shelf 28a. In a following step 703, the first bottom opening 34a is opened, so that the article 10a ... 10p falls onto the article stack 41. If the article stack 41 is ready to be packaged in step 704, the second bottom opening 34b is opened in a step 705, so that the article stack 41 falls onto the feed conveyor system 26. The number of articles in the article stack 41 is determined by the corresponding order. In this regard, an order comprises one order line or multiple order lines. Each order line has at least specifications on a number of pieces of an ordered item and on a type of item. A sales order comprises at least one order. The orders are on hand as data sets. The orders are electronically acquired on a computer (not depicted).

In a further step 706, the article stack 41 is then transported away to the automated packaging machine 25 where it is packaged in a dispatch package 23. If the article stack 41 is not yet completed in step 704, steps 701 to 704 are repeated until the article stack 41 is completed in step 704.

It should be noted that other orders may also be included, which require a single article 10*a* . . . 10*p*. The article stack 41 then only contains one article. In this case, one of the bottom openings 34*a*, 34*b* may be held in the opened position and one of the bottom openings 34*a*, 34*b* may be held closed, and the article 10*a* . . . 10*p* can be discharged from the automated unloading device 36 onto the closed bottom opening 34*a*, 34*b*.

The specified process can be applied with only slight changes to case c) and/or to the fourth picking zone 24*d* shown in FIG. 6. The third bottom shelf 28*c* then takes the place of the first bottom shelf 28*a* in step 702, and the third bottom opening 34*c* takes the place of the first bottom opening 34*a* in step 703. Moreover, the mechanism of the automated packaging machine 25 takes the place of the second bottom opening 34*b* in step 705, with the help of which mechanism the article stack 41 can be conveyed into the automated packaging machine 25. Step 706 is omitted as, with actuating the mentioned mechanism, the article stack 41 is conveyed directly into the automated packaging machine 25 and is packaged in the dispatch package 23 there.

As described above, the article 10*a* . . . 10*p* may also be packed directly into the dispatch package 23 from the third bottom shelf 28*c*, so that step 705 is omitted as well.

If even the third bottom shelf 28*c* is omitted and if the article 10*a* . . . 10*p* is packed directly into the dispatch package 23 from the automated unloading device 36, steps 702 and 703 are omitted as well. The article 10*a* . . . 10*p* is then not placed on a third bottom shelf 28*c* but directly into the dispatch package 23.

Figure 11:
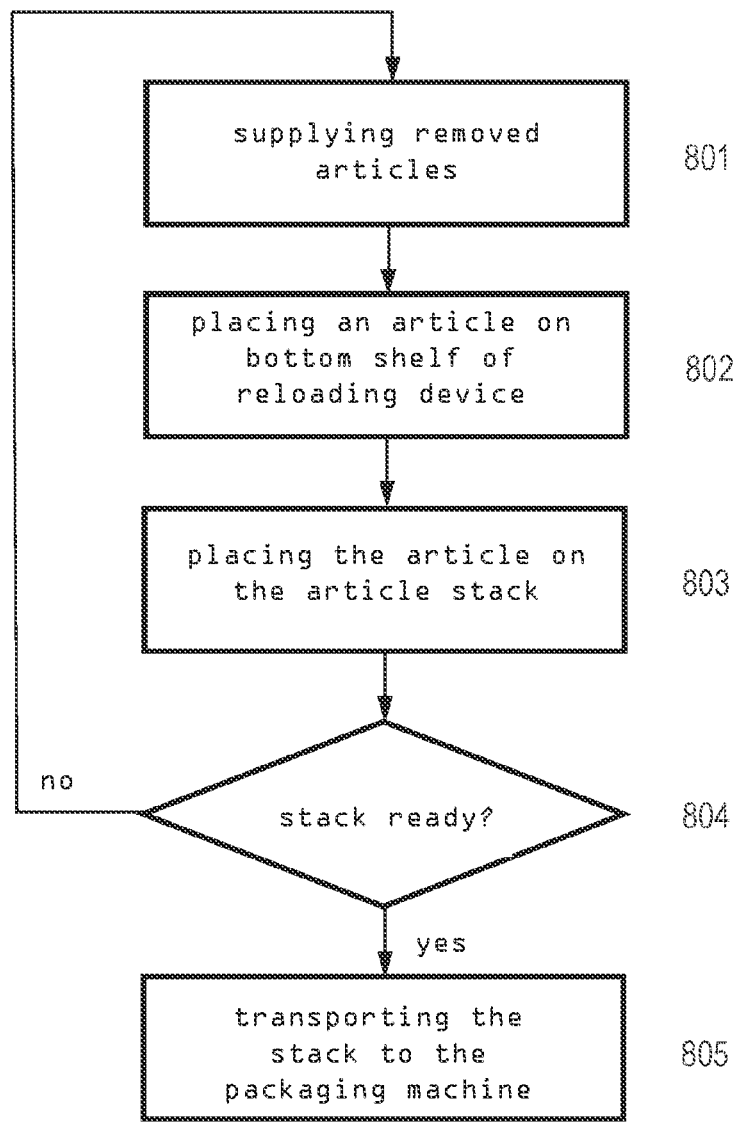
FIG. 11 an exemplary flowchart for the operation of a picking zone according to FIG. 4 and FIG. 12 an example of an autonomous mobile robot.

FIG. 11 further shows an exemplary flowchart of the process taking place in case b) and/or in the second picking zone 24*b* shown in FIG. 4.

In a first step 801, an article 10*a* . . . 10*p* is supplied at the picking station 19 via the retrieval conveyor system 17. In a further step 802, the article 10*a* . . . 10*p* is transferred from the hanging bag 13 to the first bottom shelf 30 of the automated reloading device. In a subsequent step 803, the article 10*a* . . . 10*p* is collected from the reloading device 29 and placed on the article stack 41. If the article stack 41 is ready to be packaged in step 804, it is transported to the automated packaging machine 25 in step 805 and is packaged in a dispatch package 23 there. If the article stack 41 is not yet completed in step 804, steps 801 to 804 are repeated until the article stack 41 is completed in step 804.

It should be noted that other orders may also be included, which require a single article 10*a* . . . 10*p*. The article stack 41 then only contains one article 10*a* . . . 10*p*.

The specified process can be applied with only slight changes to the third picking zone 24*c* shown in FIG. 5. The bottom shelf 33 of the picking working area then takes the place of the first bottom shelf 30 of the reloading device in step 802, and the picker 46 takes the place of the reloading device 29 in step 803.

Figure 12:
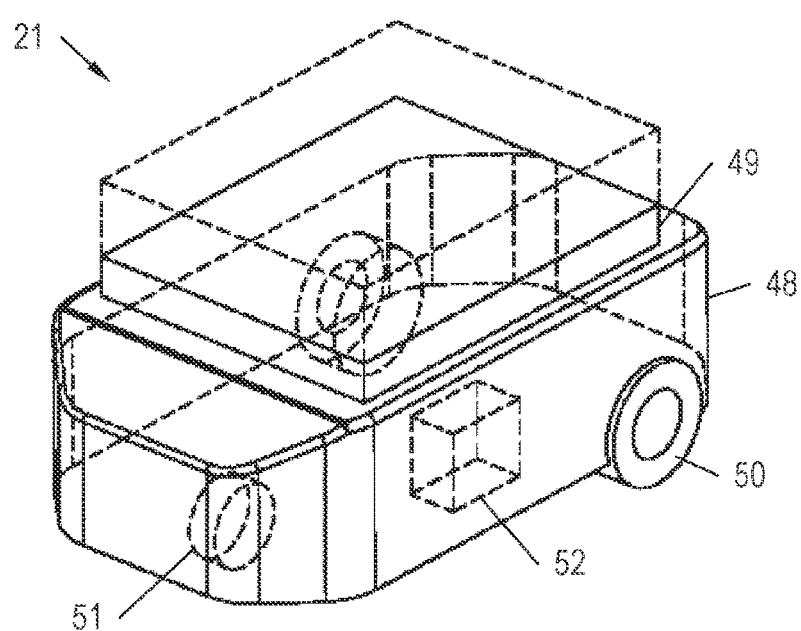

Lastly, FIG. 12 shows a possible embodiment of an autonomous mobile robots 21 ("automated guided vehicle", in short "AGV"). The autonomous mobile robot 21 comprises a chassis 48 having a drive unit and a loading platform 49 arranged on the chassis 48 for collecting, discharging and transporting an article 10*a* . . . 10*p* (not shown in this figure) or of a first transport path 11*a* . . . 11*c* (not shown in this figure). It would also be conceivable that the autonomous mobile robot 21 additionally or alternatively comprises a suspension rod, with which hanging bags 13, 13*a* . . . 13*c*, or hanging articles on article transport carriers having clothes hangers, or clothes hangers with the hanging article can be transported.

The drive unit comprises wheels 50, 51 rotatably mounted on the chassis 48, of which at least one of the wheels 50 is coupled with a drive (not depicted) and at least one of the wheels 51 can be steered. It is also possible for both wheels 50 to be coupled with the drive and be driven by it. However, the autonomous mobile robot 21 may also comprise four wheels, of which two wheels can be steered. According to the embodiment shown, the loading platform 49 is mounted on the chassis 48 so as to be adjustable between an initial position (represented in continuous lines) and a transport position (represented in dashed lines).

In the initial position, an article 10*a* . . . 10*p* or a first transport loading aid 11*a* . . . 11*c* can be driven under so as to be collected. If the loading platform 49 is adjusted out of the initial position in the direction of the transport position, the article 10*a* . . . 10*p* or the first transport loading aid 11*a* . . . 11*c* can be lifted and subsequently transported. If the loading platform 49 is adjusted out of the transport position back in the direction of the initial position, the article 10*a* . . . 10*p* or the first transport loading aid 11*a* . . . 11*c* can be parked again or be discharged.

The autonomous mobile robot 21 further comprises a travel control 52, represented schematically in dashed lines, for receiving commands from a superordinate main computer and for controlling/regulating the movements of the autonomous mobile robot 21. The travel control 52 may also comprise means for (wirelessly) transfer data to and from the autonomous mobile robot 21. Finally, the autonomous mobile robot 21 comprises sensors, which are not shown, for detecting the environment of the autonomous mobile robot 21 and for spatial orientation. The drive of the drive unit and the sensors are connected to the travel control 52.

If the autonomous mobile robots 21, 21*a* . . . 21*e* are part of the retrieval conveyor system 17, the autonomous mobile robots 21, 21*a* . . . 21*e* can discharge articles 10*a* . . . 10*p* onto the first bottom shelf 28*a* of the first automated article discharging device 27*a* (case a), the bottom shelf 30 of the automated reloading device 29 (case b), the third bottom shelf 28*c* of the second automated article discharging device 27*b* (case c), or into the automated packaging machine 25 (case d) or onto the bottom shelf 33 of the picking working area. For this purpose, a mobile robot 21, 21*a* . . . 21*e* may in particular have a device for tilting the loading platform 49.

If the autonomous mobile robots 21, 21*a* . . . 21*e* are part of the feed conveyor system 26, the autonomous mobile robots 21, 21*a* . . . 21*e* can collect articles 10*a* . . . 10*p* from the second bottom shelf 28*b* of the first automated article discharging device 27*a* (case a), from the automated reloading device 29 (case b), from the third bottom shelf 28*c* of the second automated article discharging device 27*b* (case c), or from the picker 46.

If the autonomous mobile robots 21, 21*a* . . . 21*e* are part of the goods-out conveying system 20, the autonomous mobile robots 21, 21*a* . . . 21*e* can lastly collect dispatch packages 23 from the automated packaging machine 25. In this case, it is particularly conceivable that the autonomous mobile robots 21, 21a . . . 21e do not transport individual dispatch packages 23, but that the dispatch packages 23 are discharged from the automated packaging machine 25 into a collection container, which is collected and transported away as needed by an autonomous mobile robot 21, 21a . . . 21e (or also by a manually controlled mobile robot).

As can be derived from what has been described above, it is particularly advantageous if each of the following steps is carried out (fully) automatically:

loading the first transport loading aids 11a . . . 11c and/or second transport loading aids 13, 13a . . . 13c at a loading station, and storing/retrieving/rearranging the first transport loading aids 11a . . . 11c and/or the second transport loading aids 13, 13a . . . 13c in the automated article storage 7 by means of the automated storage conveyor system 14, the retrieval conveyor system 17 and possibly by means of the rearrangement conveyor system, and unloading the first transport loading aids 11a . . . 11c and/or second transport loading aids 13, 13a . . . 13c at an automated unloading device 36 (unloading station), and packaging the articles 10a . . . 10p in an automated packaging machine 25, and transporting the articles 10a . . . 10p between the automated article storage 7 and the automated unloading device 36 by means of the retrieval conveyor system 17 (or the automated storage conveyor system 14 and the retrieval conveyor system 17 if a return storing of remaining quantities of articles 10a . . . 10p from the automated unloading device 36 to the automated article storage 7 is necessary), and transporting the articles 10a . . . 10p from the automated unloading device 36 to the feed conveyor system 25 and subsequently to the automated packaging machine 25, see FIGS. 3 and 4, or from the automated unloading device 36 to the automated packaging machine 25, see FIGS. 6 and 7, and transporting the packaged articles 10a . . . 10p (with or without a collection container) away from the automated packaging machine 25 by means of the goods-out conveyor system 20.

Finally, it should be noted that the scope of protection is determined by the patent claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

1 Storage and order-picking system
2 Building
3a, 3b Goods-in area
4a, 4b Goods-out area
5 First storage zone
6 Second storage zone
7 Automated article storage
8 Storage rack
9a, 9b Storage and retrieval device
10a . . . 10p Article(s)
11a . . . 11c First transport loading aid
12 Overhead storage track
13, 13a . . . 13c Second transport loading aid/hanging bag
14 Automated storage conveyor system
15a . . . 15e Storage section
16 Rearrangement robot
17 Automated retrieval conveyor system
18a Retrieval section
19 Picking station
20 Goods-out conveyor system
21, 21a . . . 21e Autonomous mobile robot
22 Goods-out area section
23 Dispatch package (target loading aid)
24a . . . 24f Picking zone
25 Automated packaging machine
26 Automated feed conveyor system
27a, 27b Automated article discharging device
28a . . . 28e Bottom shelf
29 Automated reloading device (gantry robot)
30 Bottom shelf of the automated reloading device
31a . . . 31c Feed conveying section
32 Working area for a picker
33 Bottom shelf of the picking working area
34a . . . 34e Bottom opening
35 Shaft wall
36 Automated unloading device
37 Conveying device (slide)
38 Printer
39 Slide
40 -
41 Article stack
42 Dispatch document
43 Suction gripper
44 Robot arm
45 Portal
46 Picker
47 Loading position
48 Chassis
49 Loading platform
50 Driven wheel
51 Steerable wheel
52 Drive control
A Pivot point

The invention claimed is:

1. A picking station (19) for automatic picking and automatic packaging of articles (10a . . . 10p), comprising:
an automated retrieval conveyor system (17) connected to an automated article storage (7) and comprising an overhead conveyor system with transport loading aids (13 . . . 13c) for transporting articles (10a . . . 10p) and an automated unloading device (36) for unloading an article (10a . . . 10p) from a transport loading aid (11a . . . 11c, 13 . . . 13c);
an automated packaging machine (25);
a goods-out conveyor system (20) connected to the automated packaging machine (25) in order to transport packaged articles (10a . . . 10p) away from the automated packaging machine (25); and
a) a first automated article discharging device (27a) and an automated feed conveyor system (26), wherein the automated feed conveyor system (26) connects the first automated article discharging device (27a) and the automated packaging machine (25) in order to transport articles (10a . . . 10p) from the first automated article discharging device (27a) to the automated packaging machine (25), the first automated article discharging device (27a) having a first bottom shelf (28a) with a first closable bottom opening (34a) and a second bottom shelf (28b) with a second closable bottom opening (34b), wherein the first bottom shelf (28a) is arranged above the second bottom shelf (28b), and the second bottom shelf (28b) is arranged above the automated feed conveyor system (26), and wherein the automated unloading device (36) is assigned to the first automated article discharging device (27a) in order to transport an article (10a . . . 10p) from a transport loading aid (11a . . . 11c, 13 . . . 13c) to the first bottom shelf (28a), and/or b) an automated reloading device (29), a bottom shelf (30) of the reloading device and an automated feed conveyor system (26), wherein the automated feed conveyor system (26) extends in the operating range of the automated reloading device (29) and is connected to the automated packaging machine (25), wherein the automated unloading device (36) is assigned to the bottom shelf (30) of the reloading device arranged in the operating range of the automated reloading device (29) in order to transport an article (10a . . . 10p) from a transport loading aid (11a . . . 11c, 13 . . . 13c) to the bottom shelf (30) of the reloading device and/or c) a second automated article discharging device (27b) assigned to the automated packaging machine (25) and having a third bottom shelf (28c) arranged above a loading position (47) of the automated packaging machine (25) and having a closable third bottom opening (34c), wherein the automated unloading device (36) is assigned to the third bottom shelf (28c) in order to transport an article (10a . . . 10p) from a transport loading aid (11a . . . 11c, 13 . . . 13c) to the third bottom shelf (28c), and wherein a dispatch package (23) prepared for closing can be provided at the loading position (47), and/or d) the automated unloading device (36) is assigned to the automated packaging machine (25) and is arranged in such a manner, that a transport loading aid (11a . . . 11c, 13 . . . 13c) can be positioned above a loading position (47) of the automated packaging machine (25) in order to discharge an article (10a . . . 10p) from a transport loading aid (11a . . . 11c, 13 . . . 13c) into a dispatch package (23) provided at the loading position (47) and prepared for closing.

2. The picking station (19) according to claim 1, further comprising:
a working area (32) for a picker (46),
an automated feed conveyor system (26) connected to the automated packaging machine (25) and extending in the operating range of the picker (46), and
a bottom shelf (33) of the picking working area arranged in the operating range of the picker (46), wherein the automated unloading device (36) is assigned to the bottom shelf (33) of the picking working area in order to transport an article (10a . . . 10p) from a transport loading aid (11a . . . 11c, 13 . . . 13c) to the bottom shelf (33).

3. The picking station (19) according to claim 1, wherein the automated unloading device (36)
in case a), is arranged above the first bottom shelf (28a) and is configured to automatically discharge the article (10a . . . 10p) from the transport loading aid (11a . . . 11c, 13 . . . 13c) onto the first bottom shelf (28a);
in case b), is arranged above the bottom shelf (30) of the reloading device and is configured to automatically discharge the article (10a . . . 10p) from the transport loading aid (11a . . . 11c, 13 . . . 13c) onto the bottom shelf (30) of the reloading device;
in case c), is arranged above the third bottom shelf (28c) and is configured to automatically discharge the article (10a . . . 10p) from the transport loading aid (11a . . . 11c, 13 . . . 13c) onto the third bottom shelf (28c).

4. The picking station (19) according to claim 1, wherein the automated unloading device (36)
in case a), is configured to automatically discharge the article (10a . . . 10p) from the transport loading aid (11a . . . 11c, 13 . . . 13c) onto a conveying device (37), and the conveying device (37) is configured to automatically discharge the article (10a . . . 10p) onto the first bottom shelf (28a);
in case b), is configured to automatically discharge an article (10a . . . 10p) from the transport loading aid (11a . . . 11c, 13 . . . 13c) onto a conveying device (37), and the conveying device (37) is configured to automatically discharge the article (10a . . . 10p) onto the bottom shelf (30) of the reloading device; and
in case c), is configured to automatically discharge the article (10a . . . 10p) from the transport loading aid (11a . . . 11c, 13 . . . 13c) onto a conveying device (37), and the conveying device (37) is configured to automatically discharge the article (10a . . . 10p) onto the third bottom shelf (28c).

5. The picking station (19) according to claim 1, wherein the first automated article discharging device (27a) comprises shaft walls (35) surrounding the first bottom shelf (28a) and second bottom shelf (28b).

6. The picking station (19) according to claim 1, wherein in case b), the picking station comprises a plurality of automated reloading devices (29) and the automated feed conveyor system (26) comprises multiple first feed conveying sections (31a) in the operating range of the plurality of automated reloading devices (29) and a second feed conveying section (31b) connecting the multiple first feed conveying sections (31a) and being connected to a third feed conveying section (31c) coupling with the automated packaging machine (25).

7. The picking station (19) according to claim 1, wherein the reloading device (29) is configured as a gantry robot or an articulated-arm robot and/or comprises a suction gripper (43).

8. The picking station (19) according to claim 1, further comprising a printer (38), which in case a), is assigned to the second bottom shelf (28b), in case b), is assigned to the feed conveyor system (26), in case c), is assigned to the automated packaging machine (25), and is assigned to the automated feed conveyor system (26).

9. The picking station (19) according to claim 1, wherein in case d), the picking station further comprises a fourth automated bottom shelf (28d) pivotable about a pivot point (A) between a substantially horizontal position and an inclined position.

10. The picking station (19) according to claim 9, wherein the automated packaging machine (25) comprises an inclined base, on which the dispatch package (23) having an opening pointing in the direction of the fourth automated bottom shelf (28d) can be arranged.

11. The picking station (19) according to claim 9, comprising a third automated article discharging device (27c) arranged above the fourth automated bottom shelf (28d) and having a fifth bottom shelf (28e) with a closable fifth bottom opening (34e).

12. The picking station (19) according to claim 10, wherein a slide is arranged between the inclined base of the automated packaging machine (25) and the fourth automated bottom shelf (28d).

13. A storage and order-picking system (1), comprising:
a goods-in area (4a, 4b);
an automated article storage (7);
an automated storage conveyor system (14) connecting the goods-in area (4a, 4b) and the automated article storage;
an automated picking station (19) for automatic picking and automatic packaging of articles (10a . . . 10p);
an automated retrieval conveyor system (17) connecting the automated article storage (7) and the picking station (19), and comprising an overhead conveyor system with transport loading aids (13 . . . 13c) for transporting articles (10a . . . 10p) and an automated unloading device (36) for unloading an article (10a . . . 10p) from a transport loading aid (01a . . . 11c, 13 . . . 13c);
wherein the picking station (19) comprises:
an automated packaging machine (25);
a goods-out conveyor system (20) connected to the automated packaging machine (25) in order to transport packaged articles (10a . . . 10p) away from the automated packaging machine, and
a) a first automated article discharging device (27a) and an automated feed conveyor system (26), wherein the automated feed conveyor system (26) connects the first automated article discharging device (27a) and the automated packaging machine (25) in order to transport articles (10a . . . 10p) from the first automated article discharging device (27a) to the automated packaging machine (25), the first automated article discharging device (27a) having a first bottom shelf (28a) with a first closable bottom opening (34a) and a second bottom shelf (28b) with a second closable bottom opening (34b), wherein the first bottom shelf (28a) is arranged above the second bottom shelf (28b), and the second bottom shelf (28b) is arranged above the automated feed conveyor system (26), and wherein the automated unloading device (36) is assigned to the first automated article discharging device (27a) in order to transport an article (10a . . . 10p) from a transport loading aid (11a . . . 11c, 13 . . . 13c) to the first bottom shelf (28a), and/or
b) an automated reloading device (29), a bottom shelf (30) of the reloading device and an automated feed conveyor system (26), wherein the automated feed conveyor system (26) extends in the operating range of the automated reloading device (29) and is connected to the automated packaging machine (25), wherein the automated unloading device (36) is assigned to the bottom shelf (30) of the reloading device arranged in the operating range of the automated reloading device (29) in order to transport an article (10a . . . 10p) from a transport loading aid (11a . . . 11c, 13 . . . 13c) to the bottom shelf (30) of the reloading device, and/or
c) a second automated article discharging device (27b) assigned to the automated packaging machine (25) and having a third bottom shelf (28c) arranged above a loading position (47) of the automated packaging machine (25) and having a closable third bottom opening (34c), wherein the automated unloading device (36) is assigned to the third bottom shelf (28c) in order to transport an article (10a . . . 10p) from a transport loading aid (11a . . . 11c, 13 . . . 13c) to the third bottom shelf (28c), and wherein a dispatch package (23) prepared for closing can be provided at the loading position (47), and/or
d) the automated unloading device (36) is assigned to the automated packaging machine (25) and is arranged in such a manner, that a transport loading aid (11a . . . 11c, 13 . . . 13c) can be positioned above a loading position (47) of the automated packaging machine (25) in order to discharge an article (10a . . . 10p) from a transport loading aid (11a . . . 11c, 13 . . . 13c) into a dispatch package (23) provided at the loading position (47) and prepared for closing.

14. A method for automatically picking and automatically packaging articles (10a . . . 10p), comprising the steps:
transporting articles (10a . . . 10p) from an automated article storage (7) to an automated unloading device (36) by means of an overhead conveyor system using transport loading aids (13 . . . 13c),
unloading the articles from the transport loading aids (11a . . . 11c, 13 . . . 13c) by means of the automated unloading device (36),
feeding the articles (10a . . . 10p) to an automated packaging machine (25),
packing the articles (10a . . . 10p) into dispatch packages (23) by the automated packaging machine (25), and
transporting the dispatch packages (23) away from the automated packaging machine (25) by means of a goods-out conveyor system (20),
wherein the steps of feeding and packing the articles (10a . . . 10p) comprises:
a) discharging an article (10a . . . 10p) from a transport loading aid (11a . . . 11c, 13 . . . 13c) and placing the article 10a . . . 10p) on a first bottom shelf (28a) of an automated article discharging device (27a) dropping the article (10a . . . 10p) through a first bottom opening (34a) arranged in the first bottom shelf (28a) when the first bottom opening (34a) is opened, and the article (10a . . . 10p) being dropped becomes part of an article stack (41) on a second bottom shelf (28b) of the automated article discharging device (27a) arranged below the first bottom shelf (28a), and, after an article stack (41) has been formed, dropping the article stack (41) through a second bottom opening (34b) arranged in the second bottom shelf (28b) is opened and the article stack (41) is conveyed to the automated packaging machine (25) by an automated feed conveyor system (26) arranged below the second bottom shelf (28b) and automatically packed into a dispatch package (23) by the automated packaging machine (25), and/or
b) discharging an article (10a . . . 10p) from a transport loading aid (11a . . . 11c, 13 . . . 13c) and placing the article (10a . . . 10p) on a bottom shelf (30), and picking the article 10a . . . 10p) from the bottom shelf (30) and placing on an automated feed conveyor system (26) by an automated reloading device (29) so as to stack the articles (10a . . . 10p) on the automated feed conveyor system (26), and, after an article stack (41) has been formed, the article stack (41) is conveyed by the automated feed conveyor system (26) to the automated packaging machine (25) and is automatically packed into a dispatch package (23) by the automated packaging machine (25), and/or
c) discharging an article (10a . . . 10p) from a transport loading aid (11a . . . 11c, 13 . . . 13c) and placing the article (10a . . . 10p) on a third bottom shelf (28c) of an automated article discharging device (27b) dropping the article (10a . . . 10p) through a third bottom opening (34c) arranged in the third bottom shelf (28c) when the third bottom opening (34c) is opened, into a dispatch package (23) provided at the automated packaging machine (25) at a loading position (47) and prepared for closing, and/or d) providing the transport loading aids (11a ... 11c, 13 ... 13c) one after another at the automated unloading device (36) and positioning a transport loading aid (11a ... 11c, 13 ... 13c) above a loading position (47) of the automated packaging machine (25), and discharging an article (10a ... 10p) from the transport loading aid (11a ... 11c, 13 ... 13c) immediately into a dispatch package (23) provided at the loading position (47) and prepared for closing.

15. The method according to claim 14, wherein the steps of feeding and packing the articles (10a ... 10p) comprise:
discharging an article (10a ... 10p) from a transport loading aid (11a ... 11c, 13 ... 13c) and supplying the article (10a ... 10p) on a bottom shelf (33) arranged in an operating range of a picker (46), and picking the article (10a ... 10p) from the bottom shelf (33) and placing on an automated feed conveyor system (26) by a picker (46) so as to stack the articles (10a ... 10p) on the automated feed conveyor system (26), and, after an article stack (41) has been formed, the article stack (41) is conveyed by the automated feed conveyor system (26) to the automated packaging machine (25) and is automatically put into a dispatch package (23).

16. The method according to claim 14, wherein an article (10a ... 10p)
in case a), is discharged automatically, by means of the automated unloading device (36) arranged above the first bottom shelf (28a), from a transport loading aid (11a ... 11c, 13 ... 13c) onto the first bottom shelf (28a),
in case b), is discharged automatically, by means of a-n the automated unloading device (36) arranged above the bottom shelf (30) of the reloading device, from a transport loading aid (11a ... 11c, 13 ... 13c) onto the bottom shelf (30) of the reloading device, and
in case c), is discharged automatically, by means of the automated unloading device (36) arranged above the first bottom shelf (28a) of the article discharging device, from a transport loading aid (11a ... 11c, 13 ... 13c) onto the third bottom shelf (28c) of the article discharging device.

17. The method according to claim 14, wherein an article (10a ... 10p)
in case a), is automatically discharged, by means of the automated unloading device (36), from a transport loading aid (11a ... 11c, 13 ... 13c) onto a conveying device (37) and are automatically discharged from the conveying device (37) onto the first bottom shelf (28a),
in case b), is automatically discharged, by means of the automated unloading device (36), from a transport loading aid (11a ... 11c, 13 ... 13c) onto a conveying device (37) and are automatically discharged from the conveying device (37) onto the bottom shelf (30) of the reloading device, and
in case c), is automatically discharged, by means of the automated unloading device (36), from a transport loading aid (11a ... 11c, 13 ... 13c) onto a conveying device (37) and are automatically discharged from the conveying device (37) onto the third bottom shelf (28c).

18. The method according to claim 14, wherein, in case d), the step of discharging the article (10a ... 10p) from the transport loading aid (11a ... 11c, 13 ... 13c) immediately into the dispatch package (23) includes the step of:
discharging the article (10a ... 10p) from the transport loading aid (11a ... 11c, 13 ... 13c) onto a fourth automated bottom shelf (28d) that is oriented in a substantially horizontal position for stacking a plurality of articles (10a ... 10p) and is pivoted about a pivot point (A) into an inclined position for transferring the plurality of articles (10a ... 10p).

19. The method according to claim 14, wherein, in case d), the step of discharging the article (10a ... 10p) from the transport loading aid (11a ... 11c, 13 ... 13c) immediately into the dispatch package (23) includes the step of:
discharging the article (10a ... 10p) from the transport loading aid (11a ... 11c, 13 ... 13c) onto a fifth bottom shelf (28e) with a closable fifth bottom opening (34e),
discharging the article (10a ... 10p) from the fifth bottom shelf (28e) onto a fourth automated bottom shelf (28d) arranged below the fifth bottom shelf (28e), wherein the fourth automated bottom shelf (28d) is oriented in a substantially horizontal position for stacking a plurality of articles (10a ... 10p) and is pivoted about a pivot point (A) into an inclined position for transferring the plurality of articles (10a ... 10p).

20. The method according to claim 18, wherein the plurality of articles (10a ... 10p) slide from the fourth automated bottom shelf (28d) pivoted in the inclined position into a dispatch loading aid that is provided on an inclined base of the automated packaging machine (25) and points, with an opening, in the direction of the fourth automated bottom shelf (28d).

21. The method according to claim 14, wherein at least a plurality of the transport loading aids (11a ... 11c, 13 ... 13c) transports exactly one article (10a ... 10p) each.

22. The method according to claim 14, wherein at least a plurality of the transport loading aids (13 ... 13c) are configured as hanging bags.

23. The method according to claim 14, wherein multiple dispatch packages (23), after packaging the articles (10a ... 10p) in the dispatch package (23), are loaded into an outer package.

24. The picking station (19) according to claim 2, wherein the automated unloading device (36) is arranged above the bottom shelf (33) of the picking working area and is configured to automatically discharge the article (10a ... 10p) from the transport loading aid (11a ... 11c, 13 ... 13c) onto the bottom shelf (33) of the picking working area.

25. The picking station (19) according to claim 2, wherein the automated unloading device (36) is configured to automatically discharge the article (10a ... 10p) from the transport loading aid (11a ... 11c, 13 ... 13c) onto a conveying device (37), and the conveying device (37) is configured to automatically discharge the article (10a ... 10p) onto the bottom shelf (33) of the picking working area.

26. The method according to claim 15, wherein an article (10a ... 10p) is discharged automatically, by means of the automated unloading device (36) arranged above the bottom shelf (33) of the picking working area, from a transport loading aid (11a ... 11c, 13 ... 13c) onto the bottom shelf (33) of the picking working area.

27. The method according to claim 15, wherein the article (10a ... 10p) is discharged automatically, by means of the automated unloading device (36), from a transport loading aid (11a ... 11c, 13 ... 13c) onto a conveying device (37)

and is automatically discharged from the conveying device (37) onto the bottom shelf (33) of the picking working zone.

\* \* \* \* \*

UNITED STATES PATENT AND TRADEMARK OFFICE
CERTIFICATE OF CORRECTION

| | | |
|---|---|---|
| PATENT NO. | : 11,912,504 B2 | Page 1 of 1 |
| APPLICATION NO. | : 17/416176 | |
| DATED | : February 27, 2024 | |
| INVENTOR(S) | : Timothy Lindley et al. | |

It is certified that error appears in the above-identified patent and that said Letters Patent is hereby corrected as shown below:

In the Claims

In Column 39, Line 36 (Line 8 of Claim 16): please delete "a-n"

Signed and Sealed this
Twenty-sixth Day of March, 2024

*Katherine Kelly Vidal*

Katherine Kelly Vidal
*Director of the United States Patent and Trademark Office*